United States Patent
Bathula et al.

(10) Patent No.: US 11,552,723 B2
(45) Date of Patent: *Jan. 10, 2023

(54) ROUTING AND REGENERATOR PLANNING IN A CARRIER'S CORE RECONFIGURABLE OPTICAL NETWORK

(71) Applicant: AT&T Intellectual Property I, L.P., Atlanta, GA (US)

(72) Inventors: Balagangadhar Bathula, Lawrenceville, NJ (US); Angela Chiu, Holmdel, NJ (US); Rakesh Sinha, Edison, NJ (US); Sheryl Leigh Woodward, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 477 days.

This patent is subject to a terminal disclaimer.

(21) Appl. No.: 16/587,627

(22) Filed: Sep. 30, 2019

(65) Prior Publication Data
US 2020/0028608 A1    Jan. 23, 2020

Related U.S. Application Data

(63) Continuation of application No. 15/956,121, filed on Apr. 18, 2018, now Pat. No. 10,432,342.

(51) Int. Cl.
*H04J 14/02* (2006.01)
*H04W 16/18* (2009.01)
(Continued)

(52) U.S. Cl.
CPC ........ *H04J 14/0284* (2013.01); *H04J 14/021* (2013.01); *H04J 14/0257* (2013.01);
(Continued)

(58) Field of Classification Search
CPC .............. H04J 14/0284; H04J 14/0279; H04J 14/0271; H04Q 11/0071;
(Continued)

(56) References Cited

U.S. PATENT DOCUMENTS

| 7,454,138 B2 | 11/2008 | Nozu |
| 7,769,296 B1 | 8/2010 | Chiu et al. |

(Continued)

FOREIGN PATENT DOCUMENTS

WO    2006/048414    5/2006

OTHER PUBLICATIONS

Gringeri et al., "Flexible Architectures for Optical Transport Nodes and Networks," IEEE Communications Magazine, Jul. 2010, pp. 40-50.

(Continued)

*Primary Examiner* — Oommen Jacob
(74) *Attorney, Agent, or Firm* — Hartman & Citrin LLC

(57) ABSTRACT

A multi-layer network planning system can determine a set of regenerator sites ("RSs") that have been found to cover all paths among a set of nodes of an optical layer of a multi-layer network and can determine a set of candidate RSs in the optical layer for use by the links between a set of nodes of an upper layer, wherein each RS can be selected as a candidate RS for the links. The system can determine a binary path matrix for the links between the set of nodes of the upper layer. The system can determine a min-cost matrix that includes a plurality of min-cost paths. The system can determine a best RS from the set of candidate RSs and can move the best RS from the set of candidate RSs into the set of RSs for the links. The system can then update the binary path matrix.

20 Claims, 17 Drawing Sheets

(51) Int. Cl.
*H04L 45/125* (2022.01)
*H04Q 11/00* (2006.01)

(52) U.S. Cl.
CPC ........ *H04J 14/0267* (2013.01); *H04L 45/125* (2013.01); *H04Q 11/0062* (2013.01); *H04W 16/18* (2013.01)

(58) Field of Classification Search
CPC ... H04Q 2011/0081; H04Q 2011/0073; H04Q 2011/0086; H04L 69/16; H04L 45/62; H04L 45/02
See application file for complete search history.

(56) References Cited

U.S. PATENT DOCUMENTS

| | | | |
|---|---|---|---|
| 7,925,163 | B2 | 4/2011 | Segal |
| 8,144,626 | B2 | 3/2012 | Zhang et al. |
| 8,150,257 | B1 | 4/2012 | Choudhury et al. |
| 8,452,176 | B2 | 5/2013 | Doverspike et al. |
| 8,565,598 | B2 | 10/2013 | Gerstel et al. |
| 8,768,167 | B2 | 7/2014 | Tanna et al. |
| 8,879,906 | B2 | 11/2014 | Patel et al. |
| 9,014,022 | B2 | 4/2015 | Peterson et al. |
| 9,350,481 | B2 | 5/2016 | Wei et al. |
| 9,392,466 | B2 | 7/2016 | Peterson et al. |
| 9,628,879 | B2 | 4/2017 | Bouda |
| 9,647,759 | B2 | 5/2017 | Bruckman |
| 9,699,074 | B2 | 7/2017 | Zhang et al. |
| 9,780,907 | B2 | 10/2017 | Bouda |
| 10,432,342 | B1 * | 10/2019 | Bathula .............. H04J 14/0267 |
| 2004/0107382 | A1 | 6/2004 | Doverspike |
| 2004/0218525 | A1 | 11/2004 | Elie-Dit-Cosaque |
| 2005/0063299 | A1 | 3/2005 | Atkinson |
| 2005/0265255 | A1 | 12/2005 | Kodialam |
| 2005/0270979 | A1 | 12/2005 | Pauluhn et al. |
| 2007/0058607 | A1 | 3/2007 | Mack-Crane |
| 2008/0144993 | A1 | 6/2008 | Bottari et al. |
| 2011/0229122 | A1 | 9/2011 | Castaldi |
| 2012/0301143 | A1 | 11/2012 | Shimizu |
| 2013/0022353 | A1 | 1/2013 | Shimizu |
| 2013/0089317 | A1 | 4/2013 | Zhang |
| 2013/0216216 | A1 | 8/2013 | Bottari |
| 2014/0207967 | A1 * | 7/2014 | Bryskin .............. H04L 45/02 709/243 |
| 2014/0233956 | A1 | 8/2014 | Zami |
| 2014/0308040 | A1 | 10/2014 | Sekiya |
| 2014/0376404 | A1 | 12/2014 | Bryskin |
| 2015/0229535 | A1 | 8/2015 | Peterson et al. |
| 2017/0346593 | A1 | 11/2017 | Kim et al. |
| 2018/0288774 | A1 | 10/2018 | Karjee |

OTHER PUBLICATIONS

Shen et al., "Impairment-Aware Lightpath Routing and Regenerator Placement in Optical Transport Networks With Physical-Layer Heterogeneity," Journal of Lightwave Technology, Sep. 15, 2011, vol. 29, No. 18, pp. 2853-2860.
Chiu et al., "Restoration Design in IP over Reconfigurable All-Optical Networks," Network and Parallel Computing, Sep. 2007, pp. 315-333.
Chowdhury et al., "On the Design of Energy-Efficient Mixed-Line-Rate (MLR) Optical Networks," Journal of Lightwave Technology, Jan. 1, 2012, vol. 30, No. 1, pp. 130-139.
Klinkowski et al., "On the Advantages of Elastic Optical Networks for Provisioning of Cloud Computing Traffic," IEEE Network, Nov./Dec. 2013, pp. 44-51.
Aibin et al., "Adaptive Modulation and Regenerator-Aware Dynamic Routing Algorithm in Elastic Optical Networks," IEEE International Conference on Communications, Jun. 2015.
Kuipers et al., "Impairment-aware Path Selection and Regenerator Placement in Translucent Optical Networks," 18th IEEE International Conference on Network Protocols, Oct. 5, 2010.
U.S. Office Action dated Nov. 7, 2018 in U.S. Appl. No. 15/956,121.
U.S. Notice of Allowance dated May 6, 2019 in U.S. Appl. No. 15/956,121.
U.S. Notice of Allowance dated Aug. 21, 2019 in U.S. Appl. No. 15/956,121.

* cited by examiner

ROUTING AND REGENERATOR PLANNING IN A CARRIER'S CORE RECONFIGURABLE OPTICAL NETWORK

CROSS-REFERENCE TO RELATED APPLICATIONS

This application is a continuation of and claims priority to U.S. patent application Ser. No. 15/956,121, entitled "Routing and Regenerator Planning in a Carrier's Core Reconfigurable Optical Network," filed Apr. 18, 2018, now U.S. Pat. No. 10,432,342, which is incorporated herein by reference in its entirety.

BACKGROUND

In an optical network, signals can only travel along a given path so far before a regenerator is required. A regenerator converts a signal from an optical signal to an electronic signal, corrects any detected errors, and then converts the signal back to an optical signal with a better optical signal-to-noise ratio. A reachable path is one that does not require regeneration. A reach matrix describes all the nodes in the optical network that are connected by reachable paths. To connect all the nodes in the optical network, regenerators are placed between nodes for which there is no reachable path. It is advantageous to place regenerators at a limited number of sites since this placement allows regenerators to serve multiple possible traffic demands.

In today's optical networks, each wavelength is provisioned independently, and regenerators are placed where needed along the route with no systematic effort to consolidate regenerator sites. In addition, restoration capacity is pre-deployed, and therefore the regenerators deployed for restoration are dedicated to specific terminals. This limits the ability to share regenerators during various failure scenarios, and leads to the deployment of far more capital equipment. More recently, carriers have selected regenerator sites to minimize the number of regenerator sites required to guarantee that all traffic demands can be met. However, this site selection methodology neglects consideration of the required restoration capacity, in both site selection and in calculating the number of regenerators required for restoration.

With technology evolution and industry consolidation, a large carrier's dense wavelength division multiplexing ("DWDM") optical network often includes several DWDM sub-networks from different vendors using different technologies. The DWDM sub-networks might vary in the number of wavelengths per fiber pair, data rate supported, and/or optical reachability parameters. These sub-networks may be part of a multi-layer network, wherein the IP traffic of a packet-layer is carried by the underlying optical layer. However, a customer requesting an end-to-end high-speed connection should not need to know the underlying heterogeneous sub-network infrastructure. It is the carrier's responsibility to optimize routing in its own heterogeneous network to save cost and to ensure high network availability. This requires a suite of network planning and circuit provisioning tools.

As new capabilities continue to be developed in optical communication networks, the planning tools used to build and provision these networks will become increasingly sophisticated. For example, reconfigurable-optical-add-drop multiplexers ("ROADMs") were developed with the promise that far fewer regenerators would be needed in the network because wavelengths could express through ROADMs without regeneration. However, carriers immediately realized that efficient wavelength assignment algorithms were needed to avoid wavelength blocking. Without these algorithms, many regenerators would need to be deployed to act as wavelength converters, and the potential savings offered by ROADMs would not be fully realized. Recently, with the rise of software-defined networks ("SDNs"), and a more dynamically reconfigurable optical layer, the benefits of planning the optical layer and the packet layer of a multi-layer network in tandem have increased.

SUMMARY

According to one aspect of the concepts and technologies disclosed herein, a multi-layer network planning system can execute instructions to implement a greedy constrained-routing regenerator location problem ("CRLP") algorithm, in consideration of an optical layer of a multi-layer network and an upper layer of the multi-layer network that utilizes the optical layer to create links between a first set of nodes of the upper layer, to perform operations. The multi-layer network planning system can determine a set of regenerator sites that have previously been found to cover all paths among a second set of nodes of the optical layer of the multi-layer network. The multi-layer network planning system can determine a set of candidate regenerator sites in the optical layer of the multi-layer network for use by the links between the first set of nodes of the upper layer, wherein each regenerator site of the optical layer can be selected as a candidate regenerator site for the links. The multi-layer network planning system can determine a binary path matrix for the links between the first set of nodes of the upper layer of the multi-layer network. The multi-layer network planning system can determine a best regenerator site from the set of candidate regenerator sites and can move the best regenerator site from the set of candidate regenerator sites into the set of regenerator sites for the links. The multi-layer network planning system can then update the binary path matrix.

In some embodiments, the multi-layer network planning system can determine a minimum cost ("min-cost") matrix that includes a plurality of min-cost paths. The cost can be a number of hops, a number of regenerator sites, or a distance.

In some embodiments, the multi-layer network planning system can also determine if all entries in the binary path matrix are equal to one. In response to determining that all entries in the binary path matrix are equal to one, the multi-layer network planning system can stop execution of the instructions to implement the greedy CRLP algorithm.

In some embodiments, the multi-layer network planning system can determine the best regenerator site from the set of candidate regenerator sites using a rank function. In some embodiments, the min-cost matrix is implemented as a min-regen matrix, wherein the rank function can select a node of the nodes of the network that belongs to a specific min-regen path in the min-regen matrix of a highest number of node pairs from a set of node pairs that do not already have a valid path. In some other embodiments, the rank function counts source-destination node pairs that get a valid path as a result of placing a regenerator at a specific node of the second set of nodes, and considers the specific node to be the best regenerator site from the set of candidate regenerator sites. In some embodiments, the multi-layer network planning system can determine the best regenerator site from the set of candidate regenerator sites using a weighted combination of both of the aforementioned rank functions.

In some embodiments, the multi-layer network planning system can seed the greedy CRLP algorithm with a subset of the second set of nodes as selected regenerator sites in the set of regenerator sites. In some embodiments, the multi-layer network planning system can, in response to a failure, consider possible consequences of the failure within the multi-layer network, and can determine a best set of regenerator sites from the set of candidate regenerator sites, for each restoration path in the multi-layer network. The failure might be a router failure of a router operating within the upper layer of the multi-layer network, wherein the upper layer includes an IP layer of the multi-layer network. The failure alternatively or additionally might be a fiber cut of an optical fiber that serves at least one of the links of the multi-layer network, wherein the optical fiber operates in an optical layer of the multi-layer network.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
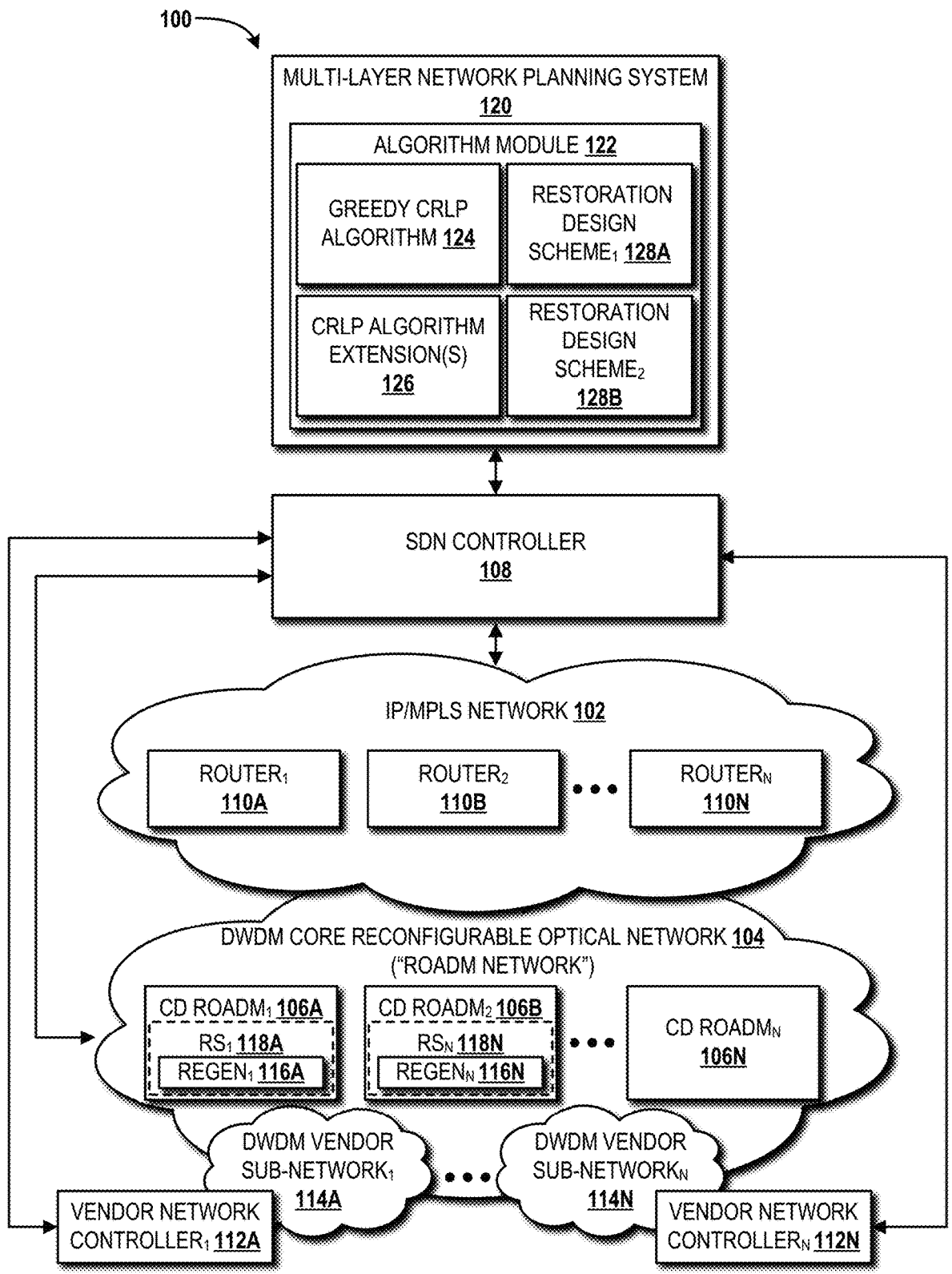
FIG. 1 is a block diagram illustrating aspects of an operating environment capable of implementing aspects of the embodiments disclosed herein.

Turning now to FIG. 1, a block diagram illustrating aspects of an operating environment 100 in which the concepts and technologies disclosed herein can be implemented will be described. The illustrated operating environment 100 includes a packet layer provided by an IP and multi-protocol label switching ("MPLS") network 102 ("IP/MPLS network 102") operating over a DWDM core reconfigurable optical network 104 ("DWDM core network 104"). An optical layer provided by the DWDM core network 104 includes a plurality of colorless-directionless ("CD") ROADMs 106A-106N (referred to herein collectively as "CD ROADMs 106" or individually as "CD ROADM 106"). The CD ROADMs 106 perform the wavelength-switching function in the DWDM core reconfigurable optical network. Hence this network is also referred to as a ROADM network. The CD ROADMs 106 provide interfaces to enable centralized control of the DWDM core network 104 to dynamically and remotely establish and release wavelength circuits, thus adjusting the layer 3 logical topology and capacity. Each wavelength connection either augments the capacity of a link or creates a new link in the IP/MPLS network 102. The operating environment 100 also includes an SDN controller 108 that extends SDN control from layer 3 to the optical layer. In this manner, the SDN controller 108 can automate and optimize network provisioning and operation tasks, such as, but not limited to, capacity augmentation and failure restoration.

The illustrated IP/MPLS network 102 includes a plurality of routers 110A-110N (referred to herein collectively as "routers 110" or individually as "router 110") that support traditional distributed routing in the data plane as well as control via the SDN controller 108 at the label-switched path ("LSP") level in the control plane. The SDN controller 108 can communicate with the routers 110 and the CD ROADMs 106 through various interfaces (not shown) to perform monitoring and control tasks. For example, in the optical layer provided by the DWDM core network 104, the SDN controller 108 can establish and release wavelength circuits to adjust the layer 3 logical topology. In some embodiments, the SDN controller 108 can perform such operations through one or more vendor-specific interfaces that facilitate communication between the SDN controller 108 and one or more vendor network controllers 112A-112N (referred to herein collectively as "vendor network controllers 112" or individually as "vendor network controller 112") that control operations of respective DWDM vendor sub-networks 114A-114N (referred to herein collectively as "DWDM vendor sub-networks 114" or individually as "DWDM vendor sub-network 114"). The vendor network controllers 112 can receive instructions from the SDN controller 108 and, in response, can perform operations such as lightpath computation and configuration of the CD ROADMs 106.

In the IP/MPLS layer provided by the IP/MPLS network 102, the SDN controller 108 can monitor traffic load and link state to perform globally optimized LSP operations, including, for example, establishing LSPs, releasing LSPs, adjusting the paths/bandwidth of LSPs, and multi-path routing. Although not shown in the illustrated embodiment, the SDN controller 108 can operate in accordance with one or more policies, such as one or more policies that dictate, at least in part, implementation of the routing and regenerator planning operations disclosed herein.

In some embodiments, the SDN controller 108 is implemented as a standalone system that includes a combination of hardware and software components that work together to provide the functionality described herein. In other embodiments, the SDN controller 108 is implemented in a physically distributed way, such as via a cloud computing environment (best shown in FIG. 14 and described herein below with reference thereto). Those skilled in the art will appreciate the numerous designs and deployment scenarios that can be used to implement the SDN controller 108 in a real-world network.

Each of the CD ROADMs 106 operating in the DWDM core network 104 provides capabilities to the physical network, including network bandwidth pre-positioning, bandwidth-on-demand, optical layer mesh restoration, and wavelength defragmentation. In order to utilize these new capabilities, carriers pre-deploy transponders at endpoints of the optical network as well as regenerators at intermediate locations when needed. The illustrated DWDM core network 104 includes a plurality of regenerators 116A-116N (referred to herein collectively as "regenerators 116" or individually as "regenerator 116"). As optical signals are sent within the DWDM core network 104, the energy of the optical signals decreases as a function of the distance traveled, thereby requiring optical signal amplifiers every X distance. The amplification of optical signals introduces noise, and therefore carriers must implement regenerators (such as the regenerators 116) at specific locations referred to as regenerator sites ("RS") 118A-118N (referred to herein collectively as "RSs 118" or individually as "RS 118") to maintain a signal-to-noise ratio ("SNR") above a specific threshold. The illustrated CD ROADM$_1$ 106A and the CD ROADM$_2$ 106B have been selected as RSs 118A, 118N, respectively. In particular, the RS$_1$ 118A includes the regenerator 116A and the RS$_N$ 116N includes the regenerator 116N. The CD ROADM$_N$ 106N does not include a regenerator 116. In accordance with some of the concepts and technologies disclosed herein, a multi-layer network planning system 120 can execute an algorithm module 122 to plan placement of RSs 118 at a subset of the CD ROADMs 106 provided by the DWDM core network 104, as will be described in greater detail below.

ROADM networks have complicated reach characteristics. In a production network, the distance a signal can propagate without regeneration depends on many factors, including the distance between amplifiers, the amplifier model, the number of traversed nodes, and the wavelength. In fact, reachability parameters and formulas are often not publicly available. Vendors generally create proprietary sub-network planning systems/tools. Nevertheless, vendor sub-network planning systems/tools typically have a common function to determine whether a path within a sub-network (e.g., DWDM vendor sub-network 114) is reachable or not. Based upon this common function, it is possible to request each sub-network vendor tool to provide a reachability matrix for each vendor's sub-network domain—that is, a list of all reachable paths within a corresponding one or more of the DWDM vendor sub-networks 114. The reachability matrices can be used to "glue" the DWDM vendor sub-networks 114 together and efficiently route a circuit over the DWDM core network 104. The multi-layer network planning system 120 can use the reachability matrices to determine where regeneration is needed, such as at the RS$_1$ 118A and the RS$_N$ 118N in the illustrated example. For ease of explanation, simulation results disclosed herein use a single "reach distance" to calculate a reachability matrix that is used by the multi-layer network planning system 120, but the algorithm module 122 can be designed to accommodate a general reachability matrix.

By deploying the regenerators 116 at a subset of the CD ROADMs 106 (i.e., at the RSs 118), carriers can realize better sharing of spare regenerators to accommodate random network demands and to improve operational efficiencies by requiring fewer truck rolls. Carriers have defined a new routing-constrained regenerator location problem. This problem is NP-hard and presents an algorithm that can be tuned to accommodate different priorities or costs. Results of implementing the algorithm for various network topologies, reach distances, and cost metrics show that this algorithm gives near-optimal solutions in most studied cases.

In addition to bandwidth-on-demand wavelength services that require pre-deployed regenerators, the concepts and technologies disclosed herein address the requirements of upper-layer networks, such as in the IP/MPLS layer provided by the IP/MPLS network 102, to address failure scenarios in the IP/MPLS network 102 and in the CD ROADMs 106 of the DWDM core network 104. In response to a failure, the SDN controller 108 can coordinate with the DWDM core network 104 to dynamically add new capacity to surviving links and/or restore failed links using the re-configurability function of the ROADM layer. This is in contrast to a traditional IP network, where restoration capacity is pre-provisioned to accommodate any single router outage or fiber cut. The concepts and technologies disclosed herein consider such an SDN-controlled dynamic IP-over-optical network, and optimize the regenerator site planning and regenerator pre-deployment for both layers' demands.

This is accomplished, in part, by extending a greedy algorithm used to solve a constrained-routing regenerator location problem ("CRLP") to incorporate details specific to a multi-layer network and to deal with failure scenarios.

The algorithm module 122 includes a greedy CRLP algorithm 124 that, when executed by the multi-layer network planning system 120, can reduce the number of RSs and network costs. The greedy CRLP algorithm 124 can be extended through one or more CRLP algorithm extensions 126 that provide additional functionality for handling multi-layer networks (e.g., the IP/MPLS network 102 and the DWDM core network 104). The CRLP algorithm extension(s) 126 also can consider the implications of the DWDM core network 104 having a larger footprint than that of the IP/MPLS network 102.

The CRLP entails minimizing the number of RSs with constraints on circuit routing. For example, circuits can be constrained to use only paths where the cost is the sum of regenerator and wavelength-km cost. This is in contrast to the explicit routing regenerator location problem ("ERLP"), where the routes are fully-constrained. The CRLP algorithm extensions 126 extend the functionality of the greedy CRLP algorithm 124 to a multi-layer network scenario in consideration of both network carrier constraints and restoration design in accordance with restoration design schemes 128A, 128B. Given a network topology with link distances, a reach distance (i.e., the maximal optical distance without requiring regeneration), and a set of constraints that restricts the set of paths between any node pair, a goal of the multi-layer network planning system 120 is to execute the greedy CRLP algorithm 124 to find a minimum set of RSs so that between each node pair at least one constrained route is reachable using the regenerators 116 in the RSs 118.

Figure 2A:
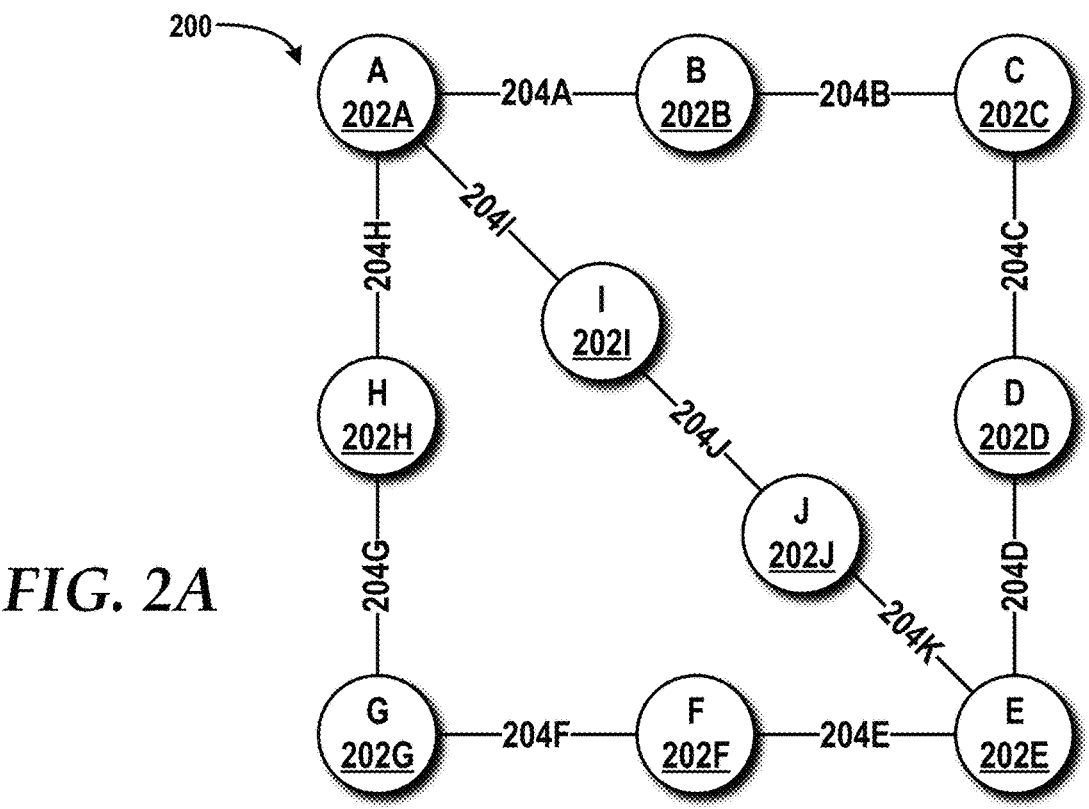
FIGS. 2A-2B are diagrams illustrating an exemplary ROADM network topology as a network graph, and a resultant network graph after transformation in accordance with aspects of the embodiments disclosed herein.

Turning now to FIG. 2A, an example diagram illustrating an exemplary ROADM network topology 200 is shown. The ROADM network topology 200 includes a plurality of nodes 202A-202J (each node could potentially be an RS, such as one of the RSs 118 shown in FIG. 1) and a plurality of optical links 204A-204K (referred to herein collectively as "optical links 204" or individually as "optical link 204") at the optical layer. It is assumed that the optical reach is equivalent to 2.5 hops. For the unconstrained-routing regenerator placement problem ("URLP"), where the only requirement is availability of a path with no requirement of the path being minimum distance ("min-distance") or minimum regenerator ("min-regenerator"), all of the regenerators 116 can be placed at only three nodes: node A 202A, node E 202E, and node I 202I This is because a path between any node pair can be constructed using this subset of the RSs 118. For the ERLP, if paths are required to be min-distance, all of the regenerators 118 can be placed at five nodes: node A 202A, node C 202C, node E 202E, node G 202G, and node I 202I. In the illustrated example, it is assumed that the length of each optical link 204 is approximately equal, but no two optical links 204 are precisely the same so that specifying min-distance constraints fixes the routes. For CRLP with the requirement of min-regenerator path, having the freedom of selecting from multiple candidate paths allows for a solution using only four nodes: node A 202A, node J 202J, node D 202I), and node F 202F. This example confirms that URLP, which has the most freedom to select routes, requires the fewest RSs, while ERLP, which has no freedom to select routes, requires more RSs; the CRLP solution implemented by the multi-layer network planning system 120 via execution of the greedy CRLP algorithm 124 lies between URLP and ERLP. The CRLP solution is NP-hard.

Figure 2B:
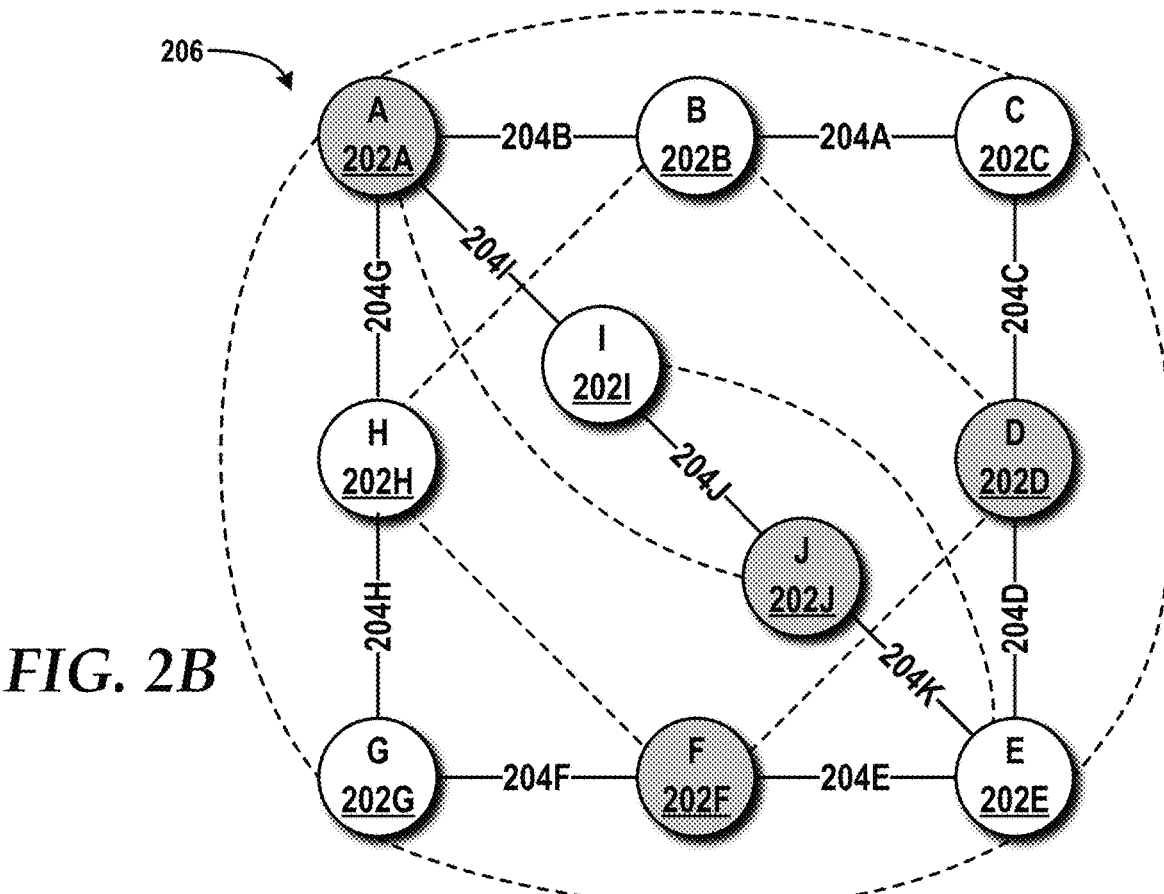

Given a ROADM topology as a graph, such as in the ROADM network topology 200 shown in FIG. 2A, when additional edges are added between all pairs of nodes that are reachable within the reach distance, the ROADM network topology 200 is transformed into a resultant network graph (GA) 206 as shown in FIG. 2B. The resultant network graph (GA) 206 can be used to prove that a path where all internal nodes have a regenerator 116 is viable. In this manner, the regenerator site problem can be reduced to a graph problem. For example, if the problem is to pick a min-regenerator path between each pair of nodes 202, this problem can be solved by selecting min-hop paths in the resultant network graph (GA) 206 with all internal nodes being in the set of RSs 118.

To select the RSs 118, the greedy CRLP algorithm 124 of the algorithm module 122 can be executed by the multi-layer network planning system 120 (shown in FIG. 1). The greedy CRLP algorithm 124 utilizes a set of data structures, which can be defined as follows:

A set RS of chosen RSs 118 thus far.
A set C of candidate RSs 118 for future placement.
A binary path matrix P such that $P_{ij}$ is 1 if and only if a valid min-hop path exists between nodes i and j using the reach distance and RSs 118 selected thus far. The greedy CRLP algorithm 124 stops when all entries in the binary path matrix P are equal to 1.

Min-hop matrix D such that $D_{ij}$ gives the min-hop distance in the resultant graph G between nodes i and j. The min-hop matrix D allows for checking whether a specific node v belongs to the min-hop path from node i to node j, since $D_{iv}+D_{vj}=D_{vj}$ only when node v is along the min-hop path. The min-hop path in the resultant graph G is the min-regen-path in the network topology. Alternatively, the min-hop matrix D can be a min-cost matrix D, wherein the cost can be the number of hops, the number of regenerator sites, or a distance.

The greedy CRLP algorithm 124 can repeatedly select what appears to be the best site from among nodes in set C, (how "best" is determined is described in more detail below), moves the best site from set C to set RS, and then updates binary path matrix P. The greedy CRLP algorithm 124 repeats these operations until all source-destination pairs have valid min-hop paths (as in the resultant network graph (GA) 206) using existing RSs 118. Customized enhancements (via the CRLP algorithm extension(s) 126) to the greedy CRLP algorithm 124 will be described herein, including a methodology for estimating how effective the greedy CRLP algorithm 124 is in comparison to the optimal algorithm.

Figure 3:
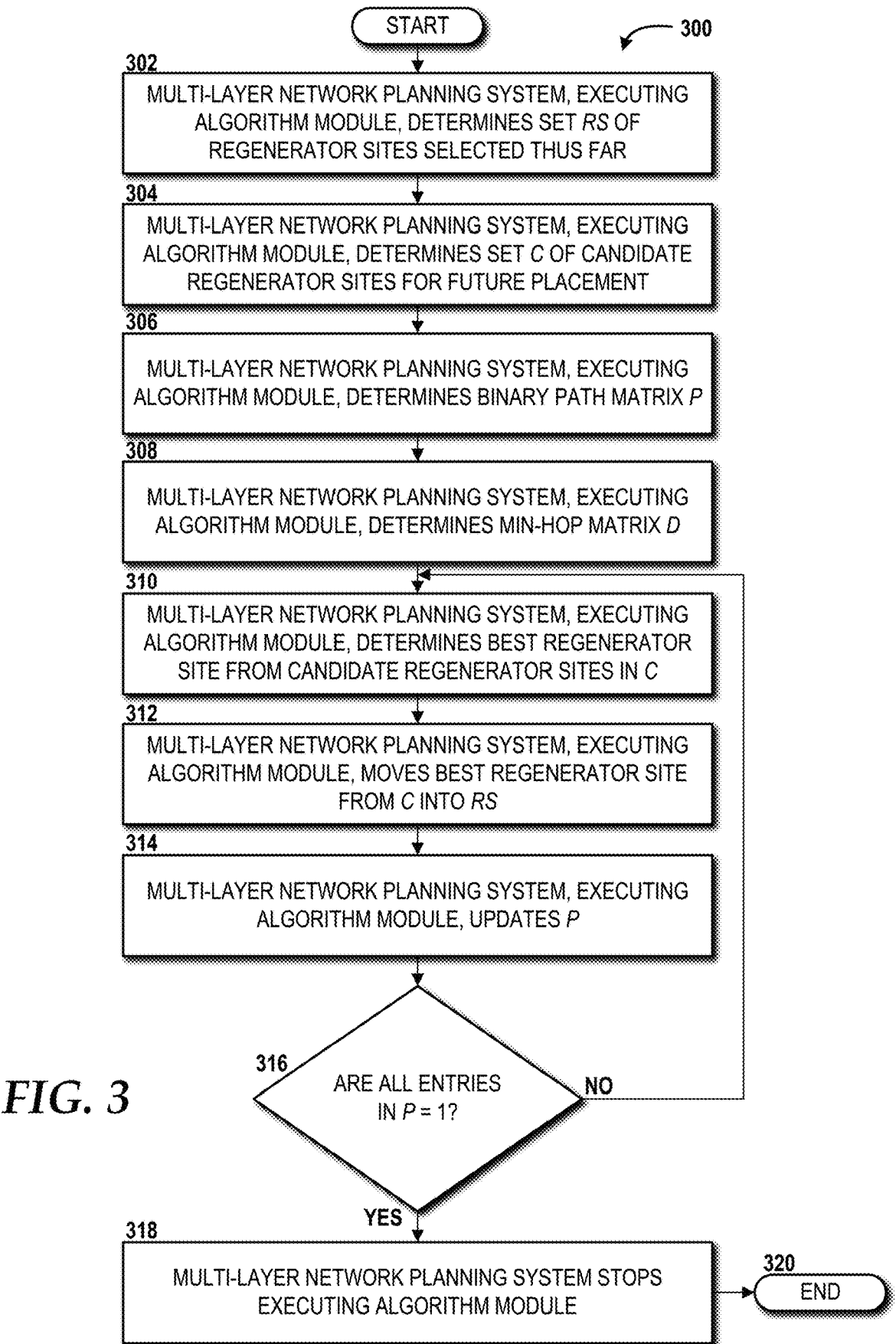
FIG. 3 is a flow diagram illustrating a method for implementing a greedy constrained-routing regenerator location problem ("CRLP") algorithm via a multi-layer network planning system, according to an illustrative embodiment.

Turning now to FIG. 3, a method 300 for implementing the greedy CRLP algorithm 124 via the multi-layer network planning system 120 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of one or more cloud environments, computing systems, devices, engines, controllers, or components disclosed herein to perform operations. It should be understood that the performance of one or more operations may include operations executed by one or more virtual processors at the instructions of one or more of the aforementioned hardware processors.

The method 300 will be described with reference to FIG. 3 and additional reference to FIG. 1, and in particular, the multi-layer network planning system 120 executing the algorithm module 122 that implements the greedy CRLP algorithm 124 introduced above. The method 300 begins and proceeds to operation 302, where the multi-layer network planning system 120, executing the algorithm module 122, determines the set RS of selected RSs 118 thus far. From operation 302, the method 300 proceeds to operation 304, where the multi-layer network planning system 120, executing the algorithm module 122, determines the set C of candidate RSs for future placement. From operation 304, the method 300 proceeds to operation 306, where the multi-layer network planning system 120, executing the algorithm module 122, determines the binary path matrix P such that $P_{ij}$ is equal to 1 if and only if a valid min-hop path exists between nodes i and j using the reach distance and RSs 118 in the set RS of selected RSs thus far. From operation 306, the method 300 proceeds to operation 308, where the multi-layer network planning system 120, executing the algorithm module 122, determines the min-hop matrix D such that $D_{ij}$ gives the min-hop distance in G between nodes i and j. The min-hop matrix D allows for checking whether a specific node v belongs to the min-hop path from node i to node j, since $D_{iv}+D_{vj}=D_{vj}$ only when node v is along the min-hop path.

From operation 308, the method 300 proceeds to operation 310, where the multi-layer network planning system 120, executing the algorithm module 122, determines a "best" RS from the candidate RSs in set C. Two different rank functions can be used for selecting the "best" candidate RS in C. A first rank function is to select the node that belongs to the min-hop paths of the highest number of pairs from those that do not already have a valid path ($P_{ij}=0$). A second rank function is to only count source-destination pairs that get a valid path as a result of placing a regenerator 116 on node v. While the second rank function results in rapid convergence, the second rank function introduces a problem in that during an initial phase of the greedy CRLP algorithm 124, no single regenerator placement will result in a valid path, thereby assigning a rank of zero to all candidate nodes. This problem can be avoided by considering a weighted combination of both rank functions, with a larger weight given to the second rank function.

From operation 310, the method 300 proceeds to operation 312, where the multi-layer network planning system 120, executing the algorithm module 122, moves the best RS determined at operation 310 from the set of candidate RSs in set C into the set of selected RSs thus far in set RS. From operation 312, the method 300 proceeds to operation 314, where the multi-layer network planning system 120, executing the algorithm module 122, updates the binary matrix P. From operation 314, the method 300 proceeds to operation 316, where the multi-layer network planning system 120, executing the algorithm module 122, determines if all entries in the binary matrix P are equal to 1. If, at operation 316, the multi-layer network planning system 120 determines that all entries in the binary matrix P are not equal to 1, the method 300 returns to operation 310 and the method 300 proceeds as described above. If, however, at operation 316, the multi-layer network planning system 120 determines that all entries in the binary matrix P are equal to 1, the method 300 proceeds to operation 318, where the multi-layer network planning system 120 stops executing the algorithm module 122. From operation 318, the method 300 proceeds to operation 320, where the method 300 ends.

In one embodiment, the greedy CRLP algorithm 124 is initialized without any RSs 118 and then selects a regenerator site in each iteration. Performing some pre-processing before the greedy CRLP algorithm 124 is executed can improve the time to convergence and can improve the quality of the resultant solution. In particular, for any node-pair (a, z), a regenerator 116 can be placed on all intermediate nodes in the min-hop path. A priori which min-hop path will be used is unknown. However, if node v is in all min-hop paths between node a and node z, then a regenerator 116 should be placed on node v. This set of nodes is referred to herein as $R^+$. The greedy CRLP algorithm 124 can be seeded by including all nodes in $R^+$ in the set RS.

While there is no guarantee that this pre-processing will yield a non-empty $R^+$, experiments conducted have shown that $R^+$ included many RSs 118. This is likely due to the high level of planning in designing these networks. Thus, in an intercity optical network, in addition to placing nodes in the largest population centers, nodes also are placed where planners realize regeneration will be required. This pre-processing provides at least two advantages: (i) pre-processing speeds up the convergence of the greedy CRLP algorithm 124, and (ii) pre-processing achieves a solution closer to the optimal solution. Conversely, if node u is not in any min-hop path, then an optimal regenerator assignment will not place a regenerator 116 on node u. This set of nodes is referred to herein as $R^-$.

Figure 4A:
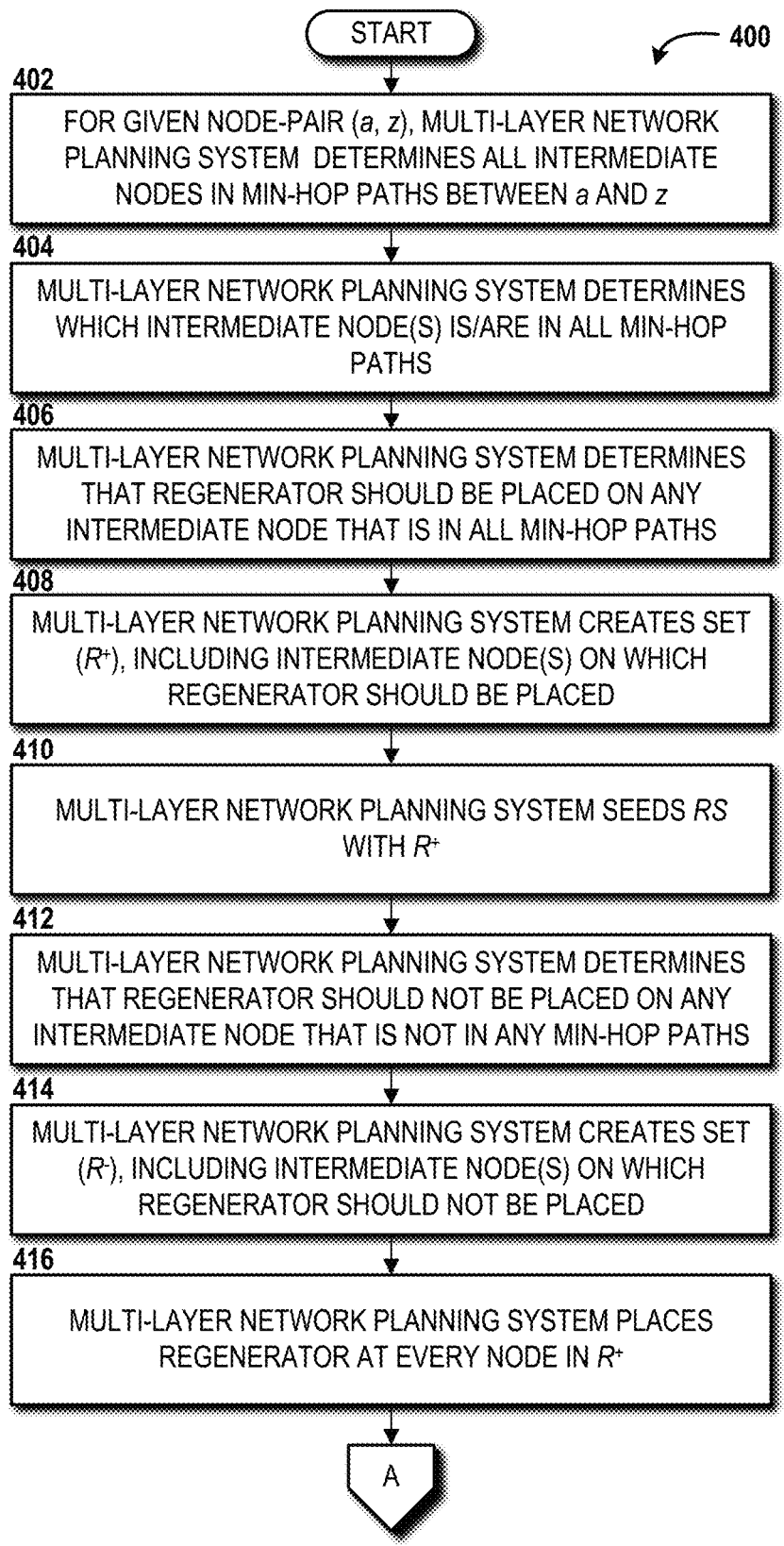
FIGS. 4A-4B are flow diagrams illustrating a method for seeding the CRLP algorithm, according to an illustrative embodiment.
Figure 4B:
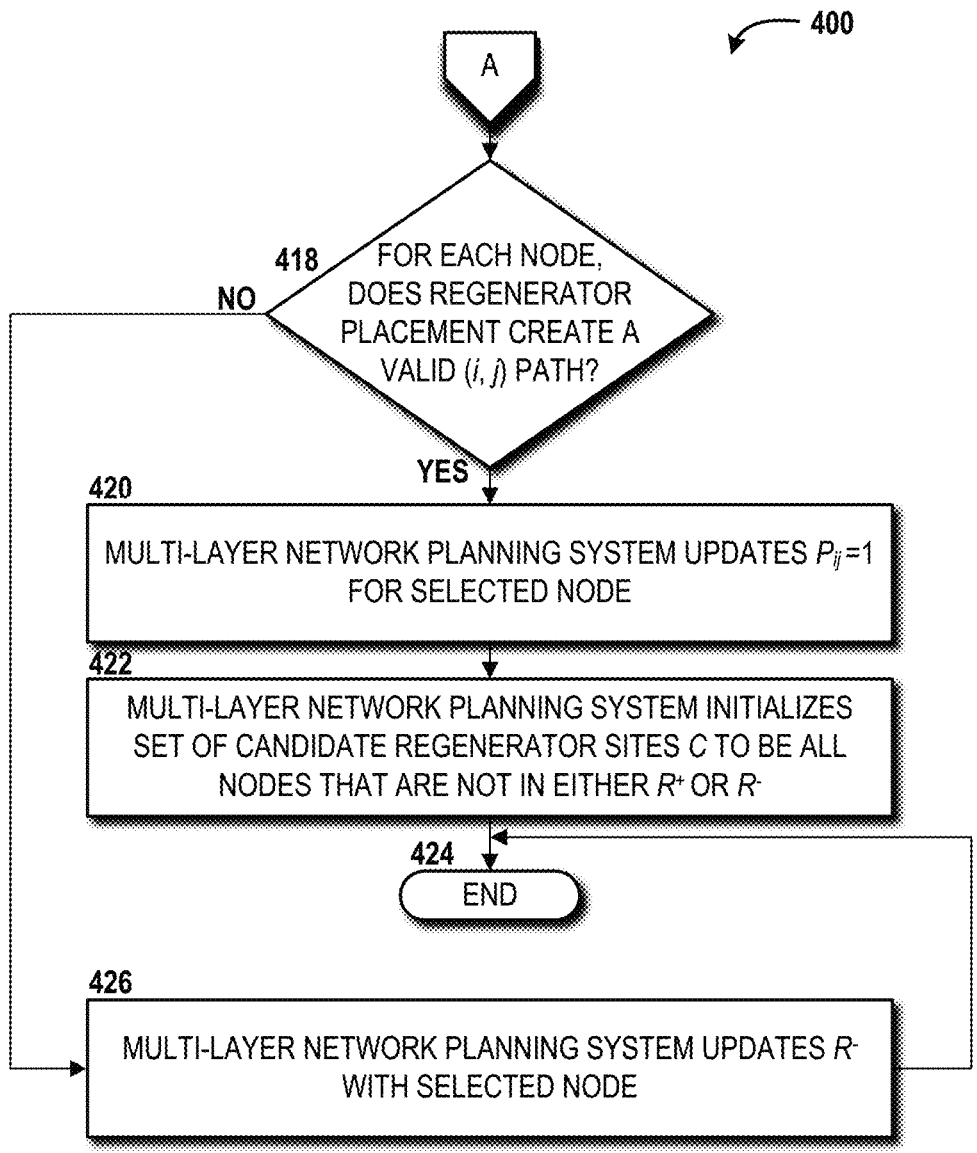

Turning now to FIGS. 4A-4B, a method 400 for seeding the greedy CRLP algorithm 124 via will be described, according to an illustrative embodiment. The method 400 begins and proceeds to operation 402 shown in FIG. 4A, where, for a given node-pair (a, z), the multi-layer network planning system 120 determines all intermediate nodes in min-hop paths between node a and node z. From operation 402, the method 400 proceeds to operation 404, where the multi-layer network planning system 120 determines which intermediate node(s) is/are in all min-hop paths. From operation 404, the method 400 proceeds to operation 406, where the multi-layer network planning system 120 determines that a regenerator 116 should be placed on any intermediate node that is in all min-hop paths. From operation 406, the method 400 proceeds to operation 408, where the multi-layer network planning system 120 creates a set of nodes $R^+$, including the intermediate node(s) on which it was determined that a regenerator 116 should be placed. From operation 408, the method 400 proceeds to operation 410, where the multi-layer network planning system 120 seeds the set RS in the greedy CRLP algorithm 124 with the set of nodes $R^+$. From operation 410, the method 400 proceeds to operation 412, where the multi-layer network planning system 120 determines that a regenerator 116 should not be placed on any intermediate node that is not in any min-hop paths. From operation 412, the method 400 proceeds to operation 414, where the multi-layer network planning system 120 creates a set of nodes $R^-$, including the intermediate node(s) on which a regenerator should not be placed. From operation 414, the method 400 proceeds to operation 416, where the multi-layer network planning system 120 places a regenerator at every node in the set of nodes $R^+$.

From operation 416, the method 400 proceeds to operation 418 shown in FIG. 4B, where the multi-layer network planning system 120 determines, for each node, if regenerator placement will create a valid (i,j) path. If, at operation 418, the multi-layer network planning system 120 determines, for a selected node, that regenerator placement will create a valid (i, j) path, the method 400 proceeds to operation 420, where the multi-layer network planning system 120 updates $P_{ij}=1$ for the selected node. From operation 420, the method 400 proceeds to operation 422, where the multi-layer network planning system 120 initializes the set of candidate RSs C to be all nodes that are not in either the set of nodes $R^+$ or the set of nodes $R^-$. From operation 422, the method 400 proceeds to operation 424, where the method 400 ends. Returning to operation 418, if the multi-layer network planning system 120 determines, for a selected node, that regenerator placement will not create a valid (i, j) path, the method 400 proceeds to operation 426, where the multi-layer network planning system 120 updates the set of nodes $R^-$ with the selected node. From operation 426, the method 400 proceeds to operation 424, where the method 400 ends.

In some embodiments, the greedy CRLP algorithm 124 can be implemented without $R^+$ and will still yield a solution where all node pairs have valid paths. However, $R^+$ serves an additional role because the RSs in $R^+$ provides a lower bound on the cardinality of the optimal solution. In most practical situations, the lower bound is very close to $1+|R^+|$.

A min-regeneration path is not necessarily min-distance and vice versa. As an example, for nodes a and z connected by two disjoint paths: $Path_1=a-v1-v2-v3-z$ and $Path_2=a-v4-v5-z$. If the reach distance is 1500 km, the length of each link in $Path_1$ is 800 km, and the length of each link in $Path_2$ is 1450 km, then $Path_1$ is the shortest (=min-distance) path. $Path_1$ requires three regenerators 116, whereas $Path_2$ requires only two regenerators 116, and thus is the min-regeneration path. By defining a cost model of the path (circuit) that incorporates both regenerator count and transmission distance, a balance between both of these factors can be achieved. In particular, the cost of $Path_i$ can be defined as follows:

$$c_r \times \text{number of regenerators in Path}_i + c_m \times \text{length of Path}_i \quad \text{Eq. (1)}$$

where $c_r$ is the unit regeneration and $c_m$ is the cost per wavelength-km. By adjusting these parameters, the desired results can be readily achieved. The two extreme cases are as follows: setting $c_r=1$, $c_m=0$ reduces to min-regeneration routing, whereas setting $c_r=0$, $c_m=1$ results in min-distance routing.

In carrier networks, routing might be constrained to min-distance due to latency requirements. Setting variables $c_r$ and $c_m$ to 1 and 1000 ensure that the shortest path is chosen (since $c_m \gg c_r$), and because $c_m$ is non-zero, RSs needed to support minimum regenerator routing along that path will be included in the set RS. This achieves min-distance and min-regeneration routing ("MDMR").

In some embodiments, the greedy CRLP algorithm 124 can be extended via the CRLP algorithm extension(s) 126 to generalize for any routing scheme by appropriately modifying the cost variables in Eq. (1), and then using the minimum cost ("min-cost"), rather than the min-hop, in defining $R^+$, $R^-$, and the path matrix P. The condition $D_{iv}+D_{vj}=D_{ij}$ is then applicable to min-cost paths.

The greedy CRLP algorithm 124 has been described in context of considering only the CD ROADMs 106 in the DWDM core network 104. Implementation of the greedy CRLP algorithm 124 in a real production network might require modification. For example, the greedy CRLP algorithm 124 should consider how the IP/MPLS network 102 is laid over the DWDM core network 104 and any operational constraints, such as minimizing changes as the IP/MPLS network 102 and the DWDM core network 104 grow and evolve. Moreover, the regenerator placement scheme implemented by the greedy CRLP algorithm 124 is designed to work well in cases where the subject network might experience failures, and therefore regenerators 116 should be placed intelligently so that changes in traffic resulting from network-restoration schemes can be supported.

The modifications required to extend the greedy CRLP algorithm 124 for application to a multi-layer network will now be described. The IP topology design is based upon a presumed traffic matrix. IP routers, such as the routers 110, are co-located with a subset of ROADM nodes, such as the CD ROADMs 106. This topology is not a full mesh, but is designed such that every IP router is capable of reaching all others, even in the event of a single failure. Links and link capacities are designed to support the traffic matrix. As described above, the greedy CRLP algorithm 124 assumes the selection of the set of RSs to enable paths between all pairs of ROADM nodes. A first modification to RS selection is to enable paths among a subset of ROADM node pairs, corresponding to IP links in the IP/MPLS network 102. It is assumed that each IP link corresponds to one or more wavelength connections in the DWDM core network 104. This modification translates into a change in the definition of $R^+$: for any (i, j)∈IP links, if node v is in an all-min-hop ROADM path between i and j, then a regenerator 116 should be placed on node v.

The stopping criteria for the greedy CRLP algorithm 124 also can be changed to accommodate a multi-layer network. In particular, the greedy CRLP algorithm 124 should be stopped when all the IP links (assumption: one wavelength connection for each IP link) are reachable with the given set of RSs. This change has the added benefit of speeding up the convergence.

In a carrier-grade network, network planners might impose operational constraints preventing a particular site being selected as a regenerator site. These operational constraints could be due to space, cooling limitations, and/or the like. The greedy CRLP algorithm 124 can accommodate any operational constraints by including these forbidden sites in the set R⁻.

Another concern might arise from how the site selection process evolves as a network grows. Running a fresh optimization for the set RS for a particular set of IP links might not be a viable approach, especially when the network traffic needs could change in the future. For instance, if new IP nodes or links are added to the network, then rerunning the RS placement algorithm for the new topology could yield an entirely new set of RSs. One way to avoid such drastic changes is by starting with a subset of RSs that works for all-to-all wavelength connections in the ROADM network 104, and then restricting the algorithm to select from this set. The original set can be computed by running the algorithm as if there are IP links between all pairs of ROADM nodes. The candidate set to this subset of RSs can be initialized instead of all nodes. This ensures the set of RSs changes gradually with changes in the IP network.

A failure, such as a router outage or fiber cut, takes out one or more IP links. Using the re-configurability of the ROADM layer, the network can dynamically add new capacity on surviving IP links and/or restore failed IP links through the ROADM layer. Each IP link is a bundle of many circuits (e.g., 100G circuits). An operational constraint is to have all circuits belonging to an IP link route on the same ROADM path. One reason for this is to keep the latencies identical.

A restoration scheme can be implemented to restore network operations to a pre-failure state. The restoration schemes disclosed herein assume that networks are designed to survive single failures. This design consideration is standard industry practice. However, the restoration schemes disclosed herein are designed to work equally well for any fixed set of failure scenarios (e.g., a network operator might include a few double or triple failures or exclude a few single failures). Two exemplary dynamic multi-layer restoration design schemes (hereinafter "restoration design schemes 128") will now be described.

Figure 5:
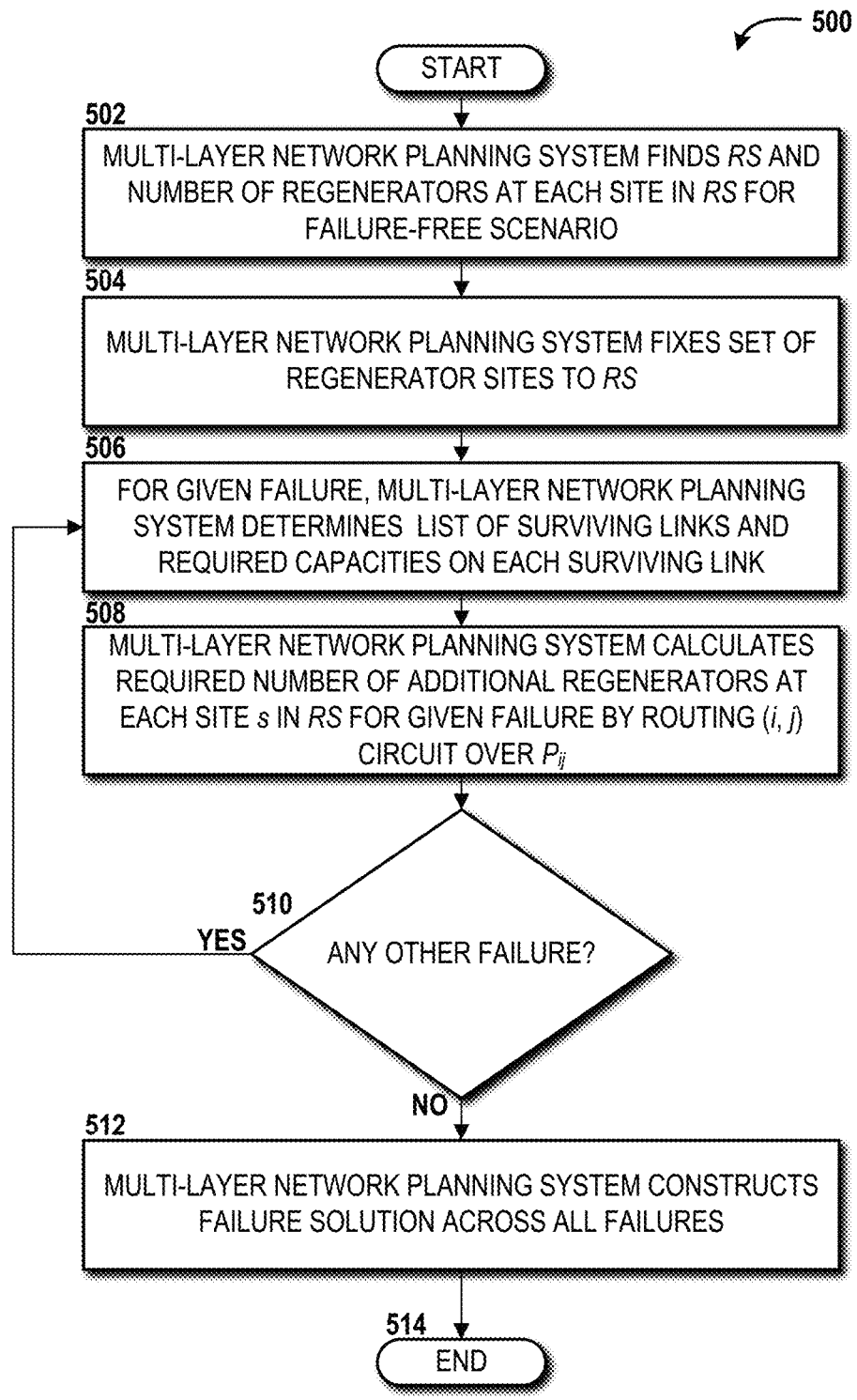
FIG. 5 is a flow diagram illustrating a method for restoring a ROADM layer in response to a failure in accordance with a first restoration design scheme.

Turning now to FIG. 5, a method 500 for restoring a ROADM layer in response to a failure in accordance with a first restoration design scheme 128A will be described, according to an illustrative embodiment. According to the first restoration design scheme 128A, for each single failure (e.g., a router outage or a fiber cut), the multi-layer network planning system 120 can determine a set of surviving IP links that require additional capacity and can calculate how much additional capacity is needed. This calculation is based upon restoring 100% of priority traffic and a certain percentage of default (e.g., best-effort) traffic. Wavelengths can be added on the surviving IP links as needed. This is done outside of the greedy CRLP algorithm 124, using a simulator for IP restoration protocol(s). For each IP link that requires additional capacity, the multi-layer network planning system 120 can plan circuits needed on the same ROADM layer. The first restoration design scheme 128A will now be described with reference to the method 500 shown in FIG. 5.

The method 500 begins and proceeds to operation 502, where the multi-layer network planning system 120 finds the set RS and the number of regenerators at each site in the set RS for a failure-free scenario. The solution here determines a ROADM layer path $Path_{ij}$ for IP link (i,j). $Path_{ij}$ can be based upon the carrier's preferred routing criteria (e.g., min-regenerator, min-distance, or any combination of these). However, once the path is determined, any additional circuits on the IP link (i, j) should follow the route $Path_{ij}$.

From operation 502, the method 500 proceeds to operation 504, where the multi-layer network planning system 120 fixes the set of RSs to the set RS. The number of regenerators at sites in the set RS might increase when the multi-layer network planning system 120 also considers failures. This is because the capacity requirement on surviving links might have to increase to accommodate traffic that would be rerouted as a result of a failure. The multi-layer network planning system 120 can now determine the required number of regenerators (including the failure cases) at each regenerator site s in the set RS.

From operation 504, the method 500 proceeds to operation 506, where, for a given failure, the multi-layer network planning system 120 determines a list of surviving links and the required capacities on each surviving link in the list. From operation 506, the method 500 proceeds to operation 508, where the multi-layer network planning system 120 calculates the required number of additional regenerators at each regenerator site s in the set RS for the given failure by routing (i, j) circuit over $P_{ij}$.

From operation 508, the method 500 proceeds to operation 510, where the multi-layer network planning system 120 determines if any other failure exists. If, at operation 510, the multi-layer network planning system 120 determines that another failure exists, the method 500 returns to operation 506 and proceeds as described above for that failure. If, however, at operation 510, the multi-layer network planning system 120 determines that no other failure exists, the method 500 proceeds to operation 512, where the multi-layer network planning system 120 constructs a failure solution across all failure. From operation 512, the method 500 proceeds to operation 514, where the method 500 ends.

It should be noted that the method 500 is performed by the multi-layer network planning system 120 in consideration of the assumption that at most one failure is processed at a time, so that the multi-layer network planning system 120 can process failures site-by-site and, for each regenerator site s, the required number of regenerators is the maximum across all failures and the failure-free scenario. Table I below illustrates how the regenerator pools are sized. In particular, Table I shows a simple example of the number of regenerators required for a failure-free case as well as three independent single points of failure. The zero entries indicate that, for those failures, no surviving link needed a regenerator at the corresponding site. The entries in bold-face type result in the maximum value in that column. For example, the first failure results in the failure of all IP links using regenerators at site 2, so no regenerators are required at site 2. However, the additional circuits for this failure necessitates two additional regenerators at site 1 (3→5). A formal description follows below.

TABLE I

Required Number of Regenerators

|  | Site 1 | Site 2 | Site 3 |
|---|---|---|---|
| Failure-Free | 3 | 5 | 4 |
| Failure 1 | 5 | 0 | 4 |
| Failure 2 | 4 | 6 | 6 |
| Failure 3 | 3 | 0 | 7 |
| Final Solution | 5 | 6 | 7 |

$U_{s,(i,j)}$ is a Boolean indicator to denote whether or not the IP link (i, j) uses a regenerator at site s. $C_{ij}$, $C_{ij}^{(f)}$ denotes the capacities (i.e., the number of wavelength connections) between a pair of IP nodes (i, j) under no-failure and failure, respectively. The multi-layer network planning system 120 can compute the number of regenerators used at each site s in RS by the following two equations:

$$r_s = \Sigma_{\forall(i,j)} U_{s(i,j)} C_{ij} \forall s \in RS, \quad \text{Eq. (2)}$$

$$r_s^{(f)} = \Sigma_{\forall(i,j)} U_{s(i,j)} C_{ij}^{(f)} \forall s \in RS. \quad \text{Eq. (3)}$$

Here, $r_s$ is the number of regenerators at sites under the no-failure condition and is the number of regenerators under failure f. The final number of regenerators $R_s$ at site s is the maximum across failure-free and all single-failure cases. That is, $$R_s = \max_f \{r_s, r_s^{(f)}\} \quad \text{Eq. (3)}$$

Figure 6:
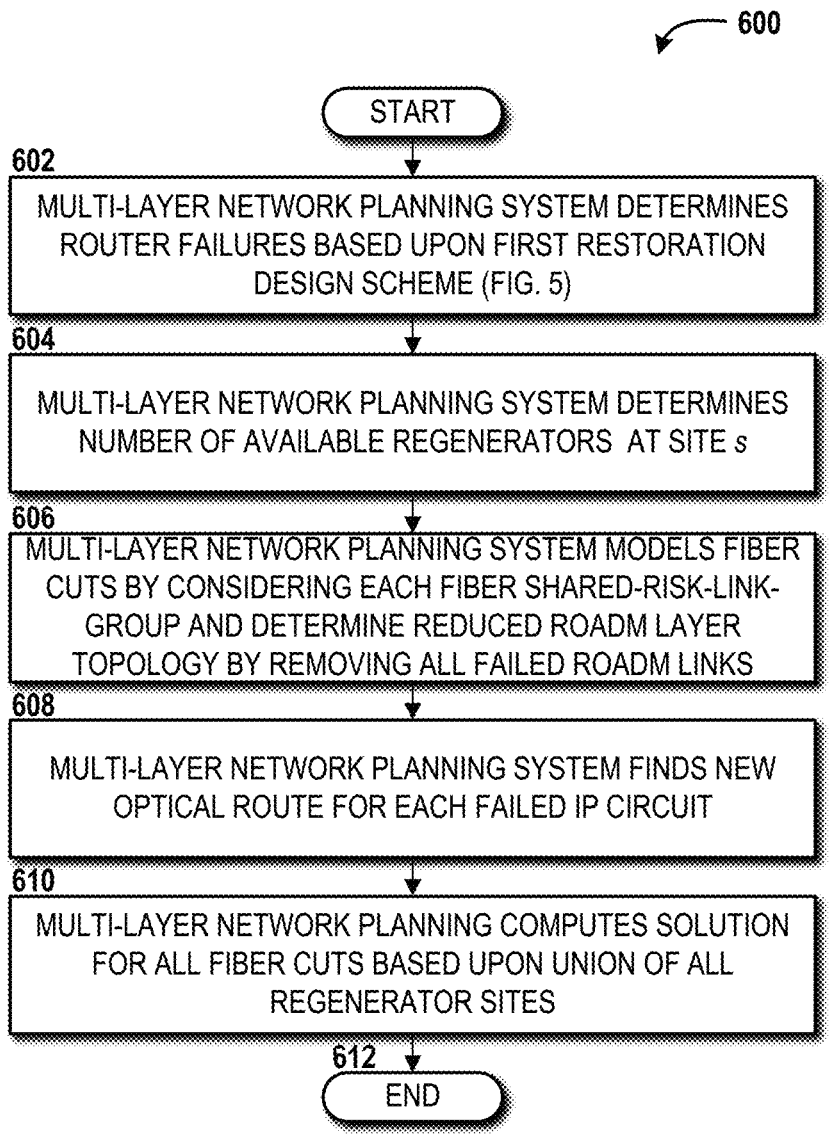
FIG. 6 is a flow diagram illustrating another method for restoring a ROADM layer in response to a failure in accordance with a second restoration design scheme.

Turning now to FIG. 6, a method 600 for restoring a ROADM layer in response to a failure in accordance with the second restoration design scheme 128B will be described, according to an illustrative embodiment. According to the second restoration design scheme 128B, restoration from a router failure uses existing IP links. However, in contrast to the first restoration design scheme 128A described above, in accordance with the second restoration design scheme 128B, restoration from a fiber-cut is performed by recreating the failed link(s) over a new path using the dynamic ROADM layer. It should be noted that this requires less coordination between the IP and optical layers, and in the case of a fiber cut, all traffic is restored. For each single router outage, the multi-layer network planning system 120 can restore the network in accordance with the first restoration design scheme 128A. That is, the multi-layer network planning system 120 can calculate which set of surviving IP links needs additional capacity and by how much. Then, the multi-layer network planning system 120 can determine how many regenerators are needed at each regenerator site to cover the failure-free scenario as well as a single router failure. For each single fiber cut, the dynamic ROADM layer is used to restore the original capacity along an alternate route.

However, dealing with fiber cuts adds new layers of complexity to the regenerator placement problem. In the case of a router outage, the set of links is fixed across all failures and only the link capacities varied (including some becoming zero). The routes for these IP links are also fixed, so the multi-layer network planning system 120 does not need to find a new RSs, and instead only needs to calculate the number of regenerators. In the case of fiber cuts, the ROADM layer is used to restore the failed IP links along paths that are diverse from the failed ROADM links. Finding new routes for these failed IP links means that the multi-layer network planning system 120 might have to introduce a new RSs and then decide how many regenerators to put at new as well as existing RSs. Some goals of this approach are to (a) minimize the number of additional sites and (b) minimize the total number of regenerators.

A formal description of the second restoration design scheme 128B is described below, but first the intuition that lead to this innovative restoration design scheme will be described. An algorithm for implementing the second restoration design scheme 128B can operate as two nested loops, wherein the outer loop addresses one fiber cut at a time and calculates any additional RSs and/or additional regenerators needed just for this fiber cut. In the end, a solution for all fiber cuts can be computed by taking a union of all RSs because each site is needed for at least one fiber cut. At each regenerator site, the required number of regenerators is the maximum required across all fiber cuts because a design goal is for at most one fiber cut. Each fiber cut can cause multiple IP links to fail. The inner loop addresses one failed IP link at a time.

Before considering a first fiber cut, the multi-layer network planning system 120 finds the number of "free" regenerators at each site. The "free" regenerators are the additional regenerators that were placed to deal with router failures. Because this solution is designed for at most one router failure or one fiber cut, the "free" regenerators are available and can be reused for fiber cuts without any additional cost. In addition, some of the IP links that failed due to the fiber cut were using regenerators, which also are included in the pool of "free" regenerators. As failed IP links are rerouted, the algorithm can be biased towards the use of these available regenerators. In other words, (a) there is no cost for using a regenerator from the pool of "free" regenerators, (b) there is a small penalty for requiring additional regenerators at existing sites, and (c) there is a steep penalty for requiring regenerators at a new site. These rewards/penalties can be combined with any other operator-mandated requirements (e.g., preference for a short path). By way of example, suppose that, after the first failure is considered, five additional regenerators are placed at regenerator site $s_1$ and a new regenerator site $s_2$ with two regenerators is used. Then, when the second failure is considered, there is no new penalty for using $s_2$ because the first failure has already mandated this as a site, and if the choice to use either $s_2$ or a completely new site $s_3$, the algorithm can be biased to use $s_2$. By a similar logic, there are an additional five available regenerators at site Si from dealing with the first failure; therefore, as an increasing number of failures are considered, more available regenerators and sites can be accumulated and can force the algorithm to find paths using regenerators committed by previous failures.

The performance of the aforementioned algorithm depends heavily on the order in which failures are considered, thus as a further optimization step, this algorithm can be run 20-50 times with different random permutations of fiber cuts and then the best solutions among these can be selected. The number of orderings that should be considered will increase with the size of the network.

The exact steps implemented by the aforementioned algorithm for dealing with the fiber cuts are now described with reference to the method 600 shown in FIG. 6. The method 600 begins and proceeds to operation 602, where the multi-layer network planning system 120 determines any router failures based upon the first restoration design scheme described herein above with reference to the method 500 shown in FIG. 5.

From operation 602, the method 600 proceeds to operation 604, where the multi-layer network planning system 120 determines the number of available regenerators $r_s^{(a)}$ at regenerator site s. The number of available regenerators $r_s^{(a)}$ at regenerator site s is the number of excess regenerators that have been committed for router failures in addition to the number of regenerators needed for failure-free routing. In particular, the number of available regenerators can be determined by the following equation:

$$r_s^{(a)} = r_s^{router} - r_s \forall s \in RS \quad \text{Eq. (4)}$$

where $r_s^{router}$ is the number of regenerators required to address router failures at site s. This number can increase as each of the possible fiber cuts is considered.

From operation 604, the method 600 proceeds to operation 606, where the multi-layer network planning system 120 models the fiber cuts by considering each fiber shared-risk-link-group ("SRLG"). The fiber SRLG is defined as a fiber segment that is diverse from all other fiber SRLGs. Each ROADM link operates on a set of fiber SRLGs. Also at operation 606, the multi-layer network planning system 120 determines, for every fiber SRLG failure, the reduced ROADM layer topology $G^{(f)}$ by removing all the failed ROADM links.

From operation 606, the method 600 proceeds to operation 608, where the multi-layer network planning system 120 finds a new optical router for each failed IP circuit. The operation 608 can be viewed as a shortest path problem on the reduced ROADM graph $G^{(f)}$. The cost of the ROADM edge (s, d) can be defined by the following equation:

$$\max(0, C_{ij}^{(f)} - r_s^{(a)}) \times c_{ij}^{(f)} + c_{(ij)}^{f} \times d_{sd}, \quad \text{Eq. (5)}$$

where $C_{ij}^{(f)}$ is the number of wavelength connections on the IP link (i, j) for a given fiber SRLG failure and $d_{sd}$ is the min-distance between the (i, j) on the new graph $G^{(f)}$. In Eq. (5), the weight $c_r^{(f)}$ can be defined as follows:

$$c_r^{(f)} = w_1^{(f)} \text{ if } s \in RS \quad \text{Eq. (6)}$$
$$= w_2^{(f)} \text{ otherwise,}$$

where $w_1^{(f)} \ll w_2^{(f)}$.

The first term in Eq. (5) captures the intuition that $r_s^{(a)}$ "free" regenerators are at s. Thus, instead of having to charge for $C_{ij}^{(f)}$ regenerators, can be charged for $C_{ij}^{(f)} - r_s^{(a)}$ regenerators.

The intuition for using Eq. (6) is that a node that is part of the set of RS (under the no-failure scenario) will have lower cost than using the node which is outside the set. Thus, the algorithm attempts to maximize the usage of locations already designated as RS. If no such route exists, then a new RS is selected. It should be noted that the restoration route is not constrained to be on the min-distance path.

After the multi-layer network planning system 120 finds a new optical route for each failed IP circuit, the method 600 proceeds from operation 608 to operation 610, where the multi-layer network planning system 120 computes a solution for all fiber cuts by taking a union of all regenerator sites because each regenerator site is needed for at least one fiber cut. At each regenerator site, the required number of regenerators is the maximum required across all fiber cuts. From operation 610, the method 600 proceeds to operation 612. The method 600 ends at operation 612.

It should be understood that, for both the first restoration design scheme 128A and the second restoration design scheme 128B, adding new capacity or restoring failed capacity from the ROADM layer can take seconds to tens of seconds depending upon how fast a new wavelength connection can be set up. To minimized packet loss during this process, a fast reroute phase (e.g., MPLS Fast Reroute) is used to restore priority traffic. The fast recovery happens after the failure is detected, and typically less than 50 milliseconds restoration time.

The multi-layer network planning system 120 can execute the algorithm module 122 to implement any of the algorithms disclosed herein. Example results of a real-world implementation of the algorithms disclosed herein on a large-scale network topology will now be described with reference to FIGS. 7-13.

Figure 7:
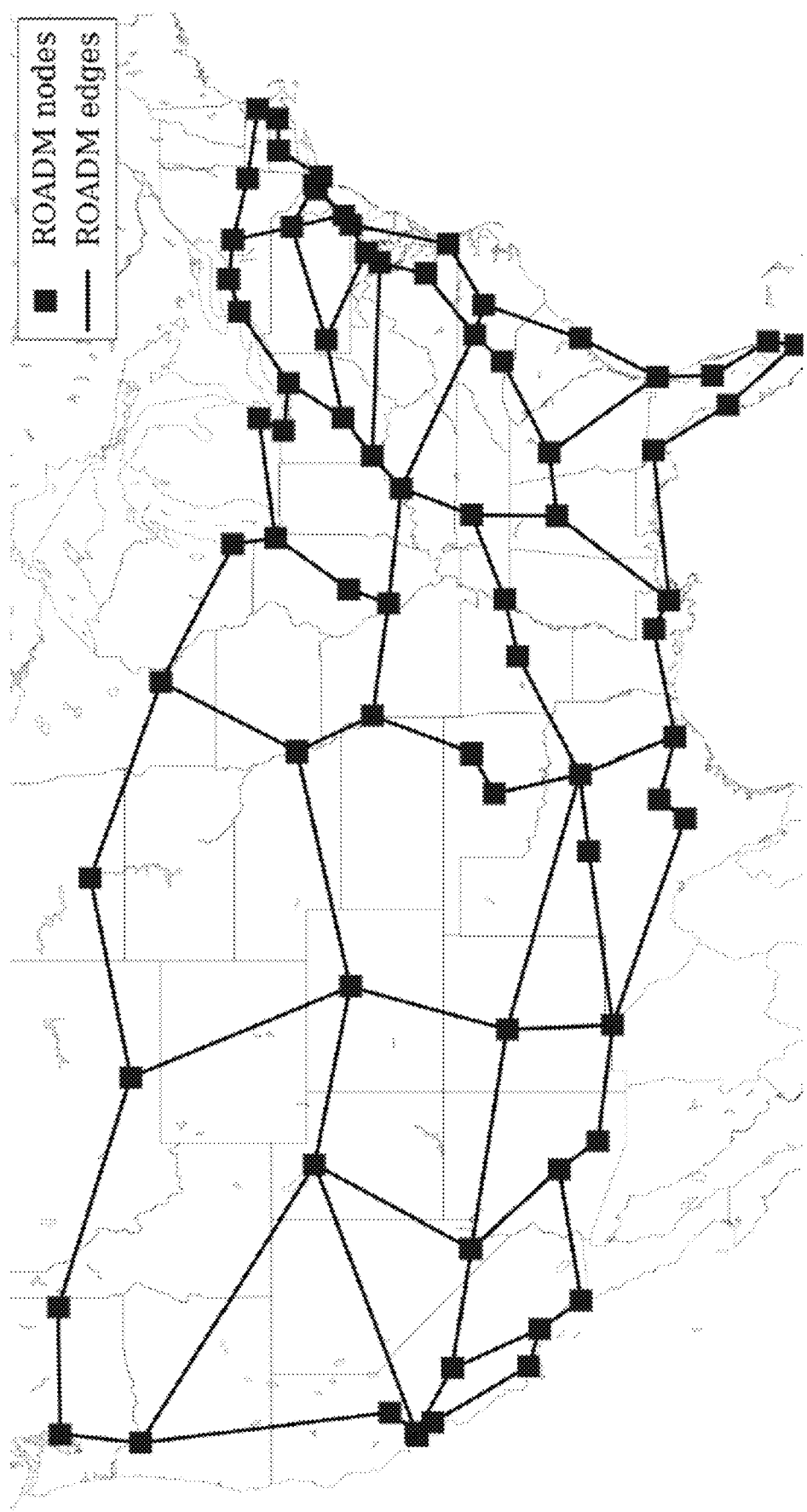
FIG. 7 is a diagram illustrating an exemplary CONUS network topology with 75 ROADM locations and 99 links.

FIG. 7 illustrates an exemplary CONUS network topology 700 with 75 ROADM locations (ROADM nodes) and 99 links (ROADM edges). The disclosed algorithms were simulated using the CONUS network topology 700 as a target network. The cost of a circuit can be parameterized as $c_r \times$ the number of regenerators in a path+$c_m \times$ the length of the path, where $c_r(c_m)$ are the unit regenerator (wavelength-km) costs. Four different sets of parameters were considered in this simulation: min-regenerator route ($C_r$=1; $c_m$=0), min-distance route ($C_r$=0; $c_m$=1), min-cost route ($C_r$=1000; $c_m$=1), and min-distance min-regenerator route ($C_r$=1; $c_m$=1000). A goal is to minimize the number of RS such that each node pair is able to pick a path according to the selected constraints. Using off-the-shelf PC components, including a 1.2 GHz dual-core processor with 8 GB of RAM, as a workstation to simulate operations that would be performed by the multi-layer network planning system 120 resulted in the first restoration design scheme being processed less than a minute to process, while the second restoration design scheme was processed in approximately 4 hours with 50 orderings.

TABLE II

Number of RSs for Different Reach Distances and Various Routing Schemes

| Reach Distance (km) | Min-Distance | Min-Regenerator | MDMR | Min-Cost |
|---|---|---|---|---|
| 1500 | 24 | 37 | 40 | 41 |
| 1800 | 19 | 29 | 32 | 32 |
| 2000 | 17 | 21 | 26 | 28 |
| 2200 | 14 | 17 | 22 | 23 |

Figure 8:
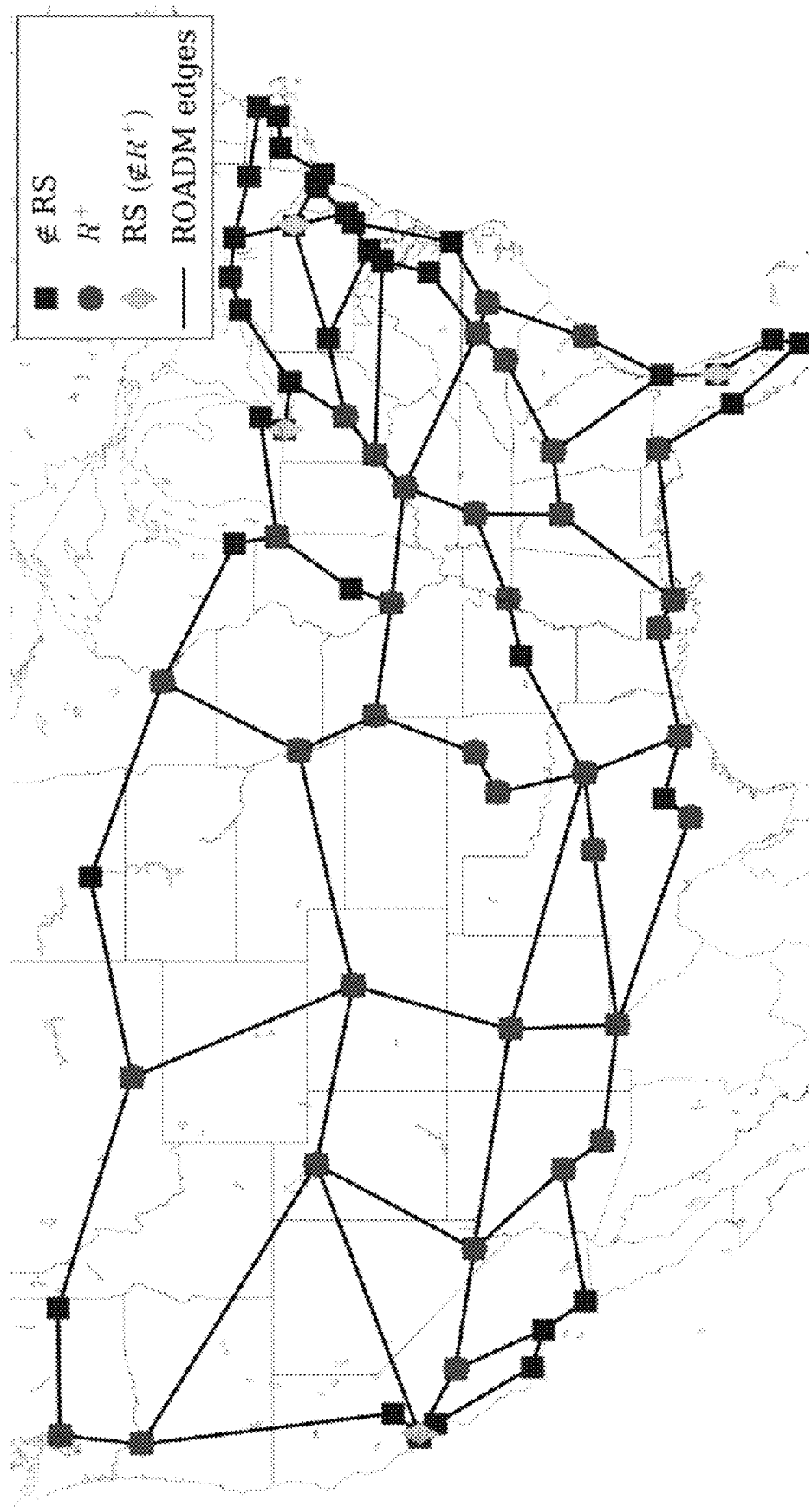
FIG. 8 is a diagram illustrating an exemplary CONUS network topology with 40 regenerator sites using minimum-distance and minimum-regenerator ("MDMR") routing for a 1500 kilometer ("km") reach distance.

Table II summarizes the total RSs for various reach metrics and routing schemes. Table II indicates that a min-distance path is not necessarily a min-regenerator path and vice versa. However, in a carrier-grade network, it is generally preferred that all the service paths be on the shortest path. By modifying the weights, as explained above, the min-distance path with the minimum number of regenerators (min-distance-min-regenerator ("MDMR")). The remaining detailed description references, for example, a reach distance of 1500 km, the MDMR routing scheme, and all 2775 possible node pairs. FIG. 8 shows circle- and diamond-shaped-locations to indicate that 40 RSs obtained for the MDMR routings scheme. The circled (green) locations are obtains using the $R^+$ algorithm explained above. Using these 40 RSs, there exists a reachable path between every node pair (i.e., any-to-any traffic) in FIG. 8 using the constrained MDMR routing.

In a multi-layer network scenarios such as described above, an IP network is overlaid on the ROADM topology. An IP topology using fewer than 50% of the nodes in the ROAMDM layer was considered, and the goal was to determine regenerator site selection for 10% of node pairs in FIG. 8, corresponding to the end points of IP links. As described above, there are two ways to optimize the regenerator site selection process.

Figure 9:
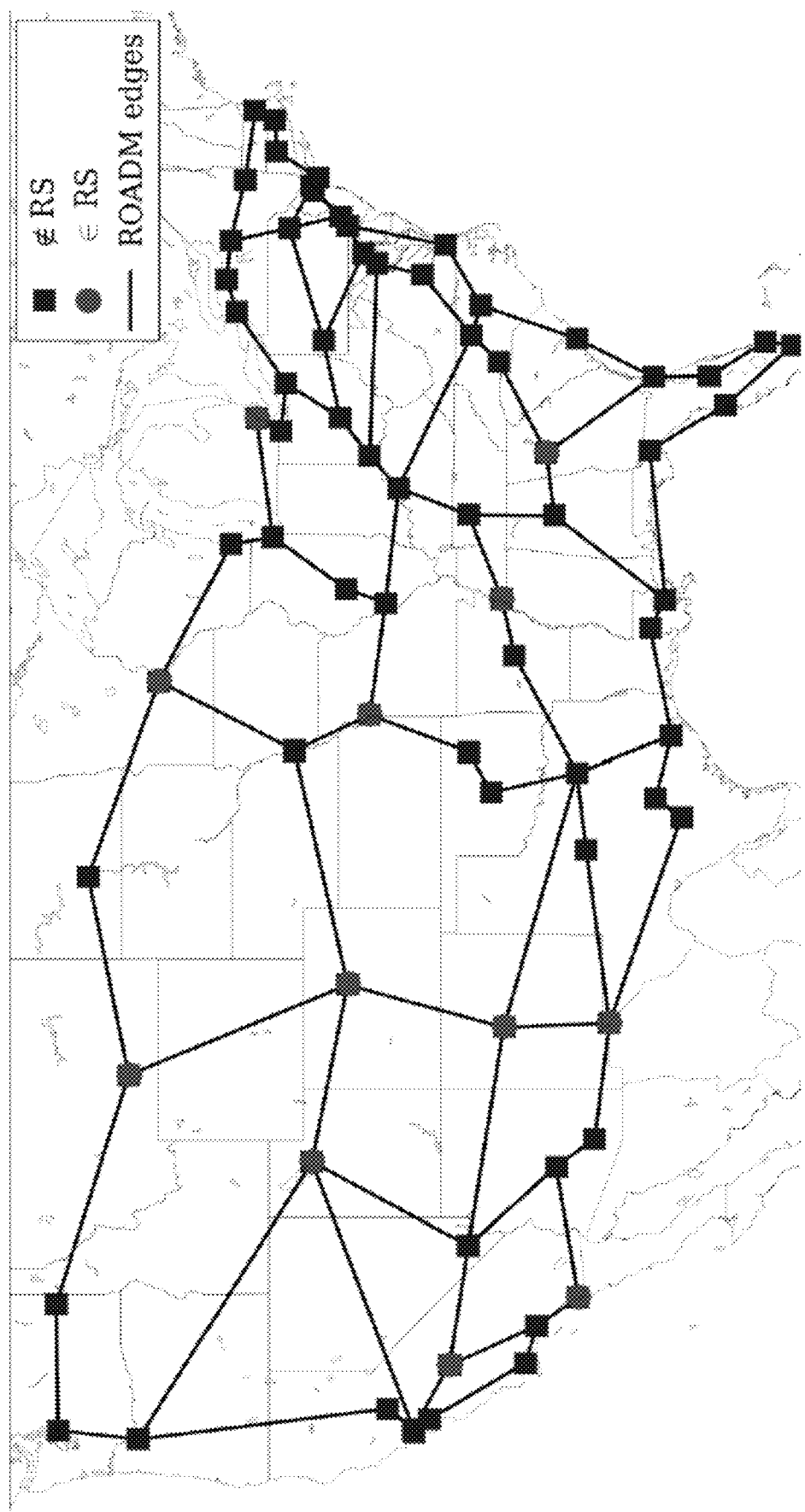
FIG. 9 is a diagram illustrating an exemplary ROADM topology and regenerator sites optimized for an exemplary Internet protocol ("IP") network topology.

IP links are chosen based on the current IP demands. IP links are routed on the ROADM layer and have to be reachable with the given set of constraints. For the IP topology used in the simulation, the results show that nearly 12% of the IP links require at least one regenerator. Assuming one wavelength connection per IP link, the results indicate that a total of 12 RSs will be needed. It should be noted that not all IP links require a regenerator, but some links require more than one regenerator. FIG. 9 shows the regenerator site selection for the current set of IP links.

Figure 10:
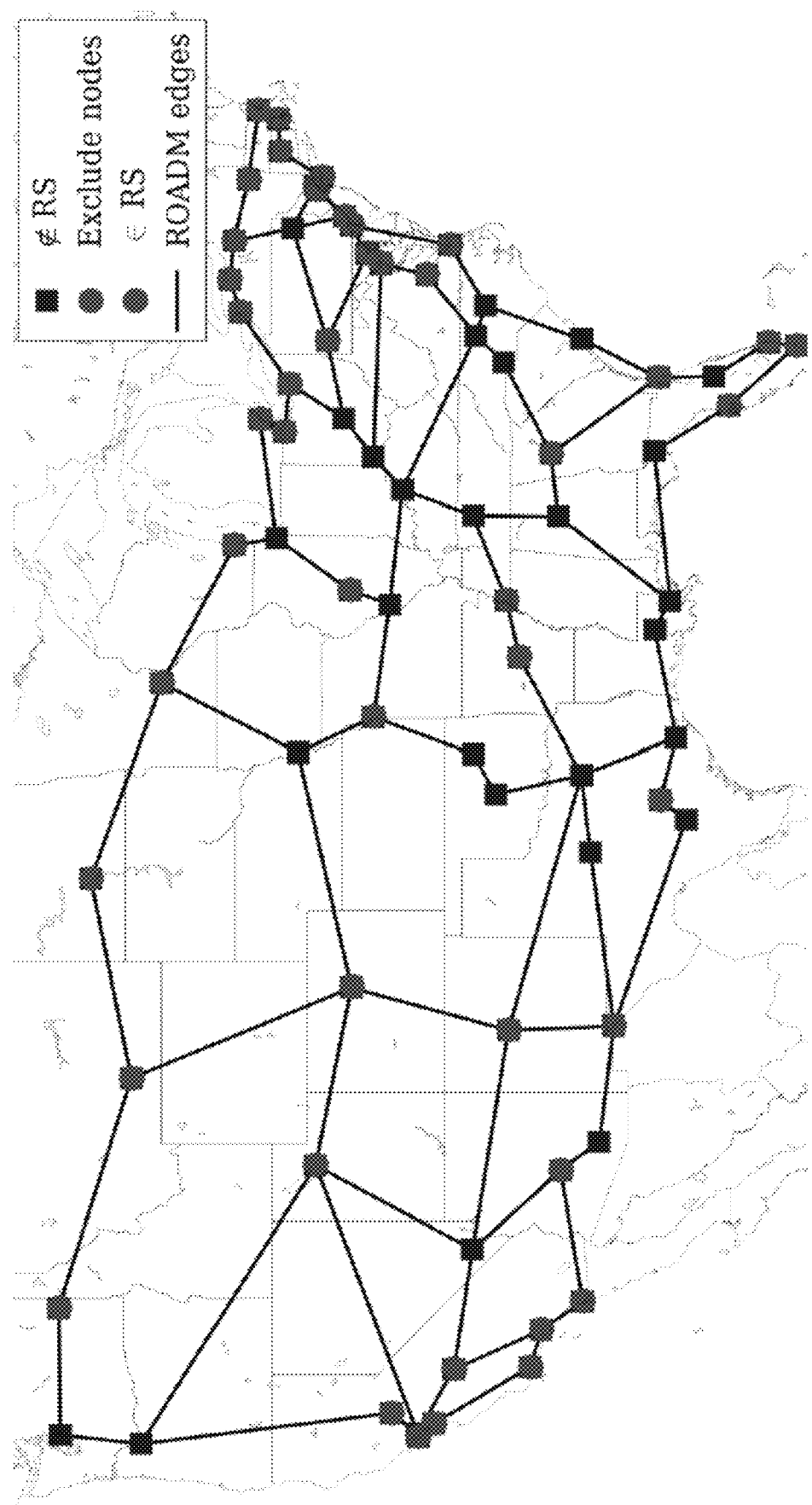
FIG. 10 is a diagram illustrating an exemplary ROADM topology and regenerator site for IP demands.

In most carrier networks, the IP router locations are co-located with the underlying ROADM topology. Given this criterion, evaluating the algorithm for a specific IP topology might not be the best approach. For instance, traffic growth can cause changes to the IP topology and the regenerator site originally selected will no longer be an optimal solution. Instead, if the best subset of RSs from all-to-all traffic demands is selected, it can be asserted that regenerator site selection is immune to changes in the IP topology. The algorithm can be modified such that all nodes that are not part of the RSs for all-to-all traffic (square blue boxes in FIG. 8) are excluded from being a potential regenerator site. These nodes are fed to the R⁻ data structure and are indicated red in FIG. 10. Therefore, the best minimum set of RSs from the 40 locations can be selected, such that there exists a reachable path on the ROADM layer for all the IP link demands. The algorithm for these specific IP demands (a subset of any-to-any traffic) requires 12 RSs. FIG. 10 shows the 12 RSs (subset of 40 RSs from FIG. 8) indicated by green circles.

The aforementioned approach of picking the RSs did not, in simulation, result in an increase of the number of location (although locations could be different) compared to FIG. 9. Reference is made to the set of RSs from FIG. 10 for the remaining detailed description.

Figure 11:
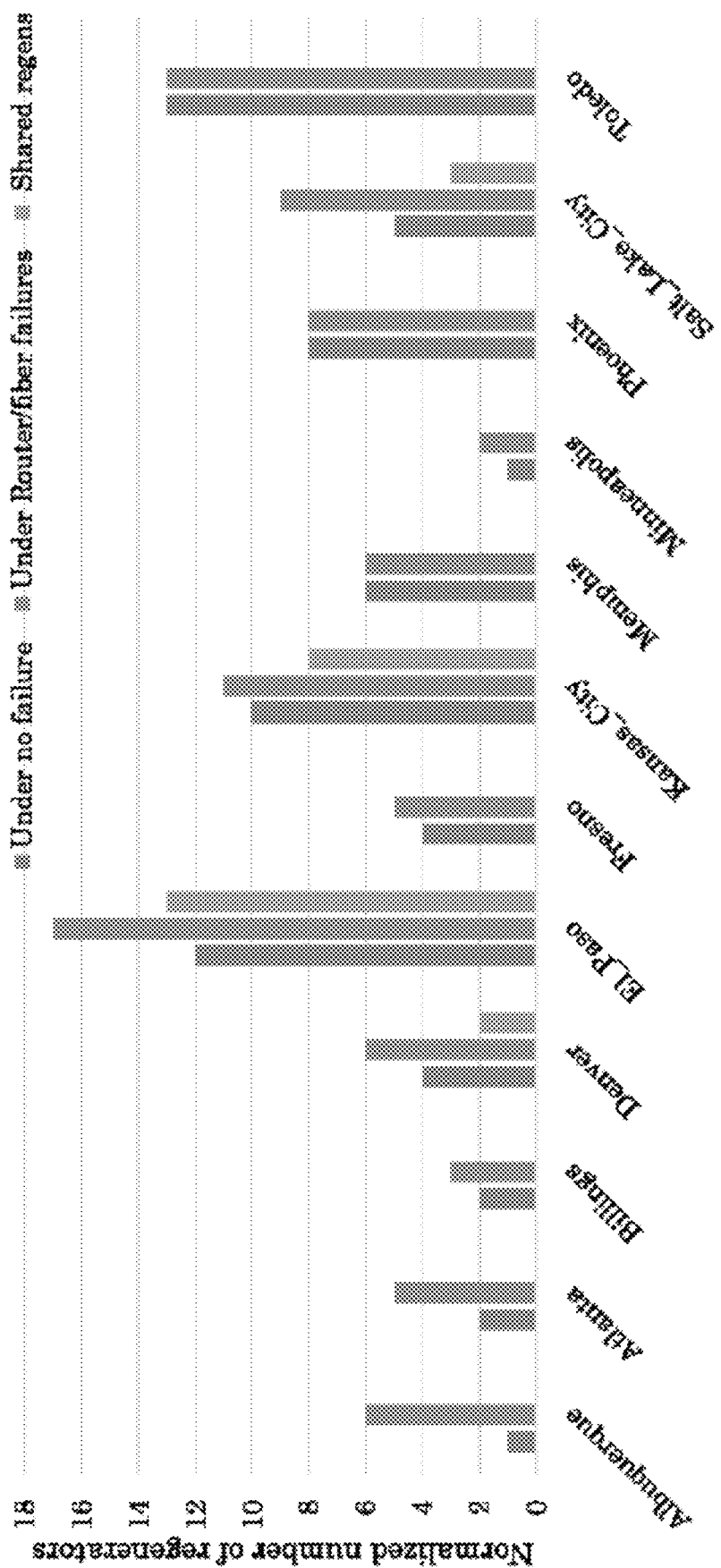
FIG. 11 is a bar chart illustrating the total number of regenerators needed under no-failure and the total number of regenerators needed using IP restoration via the first restoration design scheme.

Results from simulation of the first restoration design scheme 128A in response to a failure scenario will now be described. Turning now to FIG. 11, the total regenerators needed under no-failure and regenerators using IP restoration in accordance with the first restoration design scheme is shown. Under a no-failure scenario, the total number of regenerators at RSs is calculated as the sum of all the IP links that use the RSs in the ROADM layer routing path. From FIG. 11, under the no-failure scenario (normalized), the algorithm requires 68 regenerators in the network. This is the same number as would be required if no regenerator site concentration was performed.

The no-failure scenario is too simplistic and unlikely. Failure restoration is an important consideration in the design and planning of the network. As described above, for the first restoration design scheme, it can be assumed that all single failures (or outages), including router/fiber-SRLG failures, are restored by dynamically requesting additional capacity on a subset of surviving IP links from the ROADM layer. When a failure first occurs, traffic can be carried on the surviving IP links, which might temporarily cause congestion at the IP layer. The SDN controller 108 can dynamically provision more capacity at the optical layer in response to either the failure itself, or in response to the resulting congestion. This functionality assumes that there is a sufficient number of regenerators located at each regenerator site. To calculate how many regenerators need to be pre-deployed, every single failure group is considered—that is, every router failure and every fiber failure. This is in consideration of an assumption that at most one failure is experienced at any given time.

The first restoration design scheme provides the benefits of faster provisioning and spare regenerator reuse. Across all single failures, the maximum number of demands for a given IP link were considered. FIG. 11 shows that the total number of regenerators under all failures is 91 when utilizing the first restoration design scheme. This is a 50% increase in the number of regenerators. In a real-world implementation, the restoration overbuild will depend on a number of factors, such as topology, traffic matrix, failure mapping, and the like. During the network failures, the failed links free up the associated regenerators. These freed-up regenerators can be reused by the surviving links. It should be noted that during a failure some surviving links could see increased capacity. In FIG. 11, a plot of the maximum reuse that could happen at each regenerator site is shown. For the currently described simulation, it can be seen that the regenerator site El Paso location reuses 13 (maximum) regenerators among various failures.

Figure 12:
FIG. 12 is a step chart illustrating the cumulative number of regenerator sites for each fiber failure.

In the second restoration design scheme 128B, the same calculation is made for router failures, but for the fiber-cut failures, 100% of the traffic on the failed IP links is restored. FIG. 12 shows the results for a simulation of the second restoration design scheme. The x-axis in FIG. 12 indicates a failed link (link between two nodes in FIG. 7 and they-axis is the number of regenerators. As explained above, the fiber-link failures can be restored on the surviving links, so the IP layer (best-effort) traffic can now be carried on the longer path, which might require adding new regenerators. The number of new regenerators that are added under this restoration strategy could depend on the order in which fiber failures are evaluated. In this simulation, 50 random permutations of the fiber failures were used to pick the best solution.

FIG. 12 starts with the RSs from the no-failure scenario. It can be noticed that the fiber cut between Rochester and Syracuse adds a new regenerator site. This means that at least one IP link cannot be restored on surviving links using the 12 RSs for a given reach of 1500 km. As shown in the steps in FIG. 12, there are five fiber failures that add six new RSs. Table III below summarizes these failures and the regenerator site locations added.

TABLE III

| Added New RS for Fiber Failures | |
| --- | --- |
| Failed Link | New RS Location |
| Rochester-Syracuse | Columbus, OH |
| Birmingham-Nashville | Greensboro, NC |
| Billings-Spokane | Portland, WA |
| Jacksonville-Orlando | New Orleans, LA and Miami, FL |
| Oakland-San Francisco | Las Vegas, NV |

Figure 13:
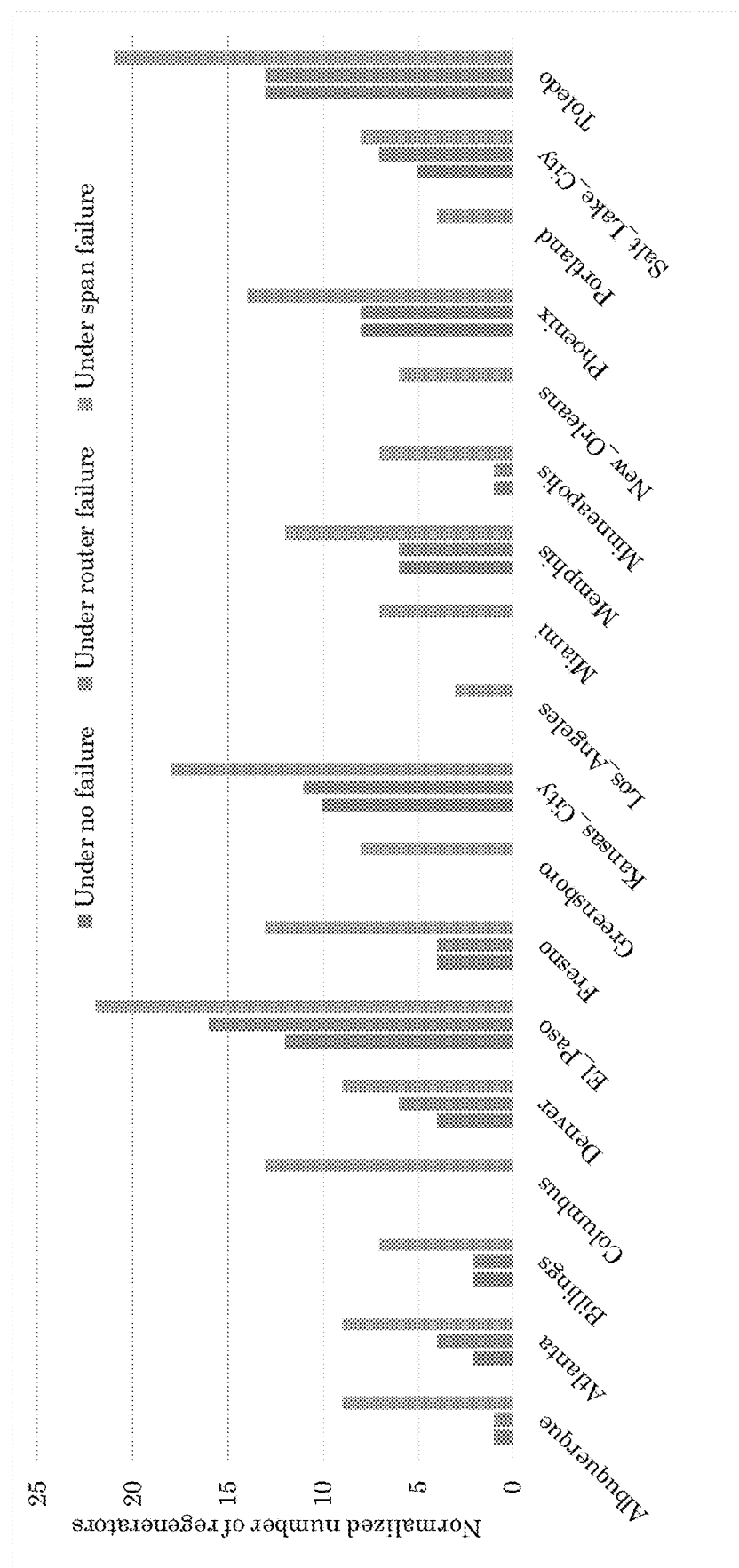
FIG. 13 is a bar chart illustrating the total number of regenerators needed under no-failure and the total numbers of regenerators needed using IP restoration via the second restoration design scheme.

FIG. 13 shows the regenerator count for the second restoration design scheme 128B. The total number of regenerators for no failure and router failure remains the same (68 and 79, respectively) as in the first restoration design scheme. However, as the fiber failures are restored in the ROADM layer, the total (maximum) regenerators required for fiber failure is 190. With the current heuristic in the second restoration design scheme 128B, 18 RSs are required. If the identical failure-free configuration is used but a naïve approach to restoration design (i.e., handling each failure case separately in choosing RSs, rather than choosing RSs to minimize the number of RSs and regenerators across the set of all failure cases), then the result is 46 RSs and 47% more regenerators. The concepts and technologies disclosed herein dedicate these regenerators to the IP network, and have not taken advantage of any regenerator sharing that might be possible between regenerators pre-deployed to address IP layer failures and regenerators pre-deployed for restoration of other wavelengths. In the second restoration design scheme, where fiber cuts are restored using additional portions of the optical network, such a strategy might reduce the number of regenerators required.

Figure 14:
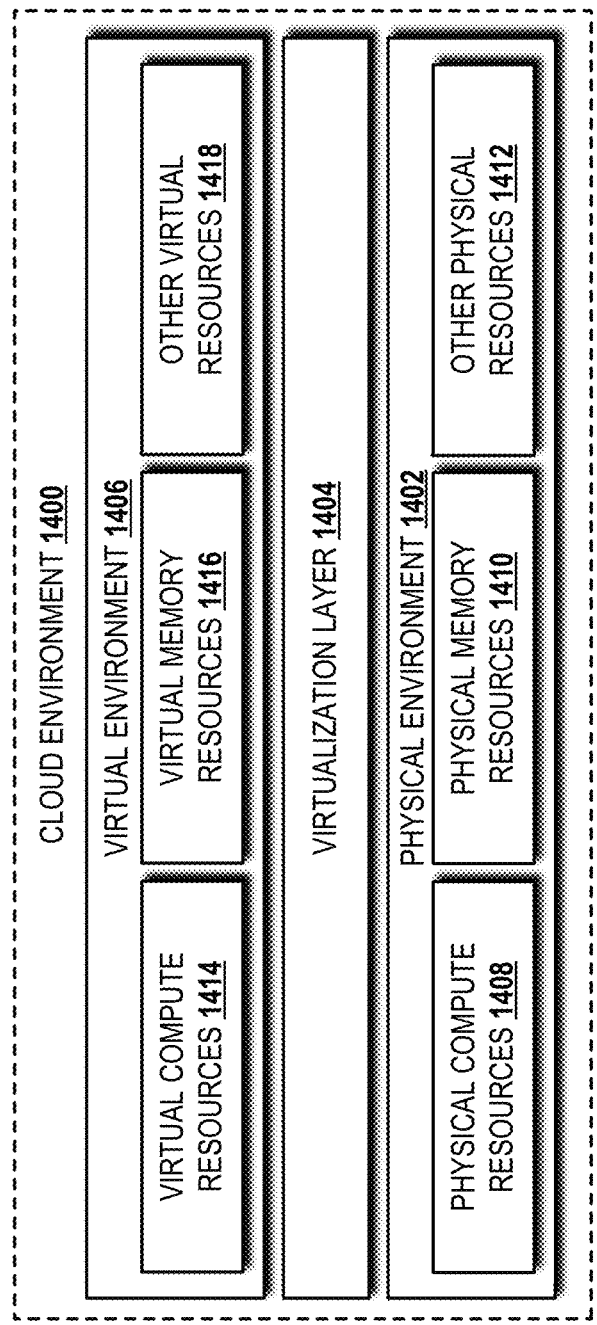
FIG. 14 is a block diagram illustrating aspects of an illustrative cloud environment capable of implementing aspects of the embodiments presented herein.

Turning now to FIG. 14, an illustrative cloud environment 1400 will be described, according to an illustrative embodiment. The cloud environment 1400 includes a physical environment 1402, a virtualization layer 1404, and a virtual environment 1406. While no connections are shown in FIG. 14, it should be understood that some, none, or all of the components illustrated in FIG. 14 can be configured to interact with one other to carry out various functions described herein. In some embodiments, the components are arranged so as to communicate via one or more networks. Thus, it should be understood that FIG. 14 and the remaining description are intended to provide a general understanding of a suitable environment in which various aspects of the embodiments described herein can be implemented, and should not be construed as being limiting in any way.

The physical environment 1402 provides hardware resources, which, in the illustrated embodiment, include one or more physical compute resources 1408, one or more physical memory resources 1410, and one or more other physical resources 1412. The physical compute resource(s) 1408 can include one or more hardware components that perform computations to process data and/or to execute computer-executable instructions of one or more application programs, one or more operating systems, and/or other software. In some embodiments, one or more components of the IP/MPLS network 102, one or more components of the DWDM core network 104, the SDN controller 108, one or more of the routers 110, one or more of the vendor network controllers 112, one or more components of one or more of the DWDM vendor sub-networks 114, the multi-layer network planning system 120, and/or other elements disclosed herein can be implemented at least in part, by the physical compute resources 1408.

The physical compute resources 1408 can include one or more central processing units ("CPUs") configured with one or more processing cores. The physical compute resources 1408 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 1408 can include one or more discrete GPUs. In some other embodiments, the physical compute resources 1408 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1408 can include one or more system-on-chip ("SoC") components along with one or more other components, including, for example, one or more of the physical memory resources 1410, and/or one or more of the other physical resources 1412. In some embodiments, the physical compute resources 1408 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 1408 can be or can include one or more hardware components architected in accordance with an ARM architecture, available for license from ARM HOLDINGS of Cambridge, United Kingdom. Alternatively, the physical compute resources 1408 can be or can include one or more hardware components architected in accordance with an x86 architecture, such an architecture available from INTEL CORPORATION of Mountain View, Calif., and others. Those skilled in the art will appreciate the implementation of the physical compute resources 1408 can utilize various computation architectures, and as such, the physical compute resources 1408 should not be construed as being limited to any particular computation architecture or combination of computation architectures, including those explicitly disclosed herein.

The physical memory resource(s) 1410 can include one or more hardware components that perform storage/memory operations, including temporary or permanent storage operations. In some embodiments, the physical memory resource(s) 1410 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1408.

The other physical resource(s) 1412 can include any other hardware resources that can be utilized by the physical compute resources(s) 1408 and/or the physical memory resource(s) 1410 to perform operations described herein. The other physical resource(s) 1412 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1402 can be virtualized by one or more virtual machine monitors (not shown; also known as "hypervisors") operating within the virtualization/control layer 1404 to create virtual resources that reside in the virtual environment 1406. The virtual machine monitors can be or can include software, firmware, and/or hardware that alone or in combination with other software, firmware, and/or hardware, creates and manages virtual resources operating within the virtual environment 1406.

The virtual resources operating within the virtual environment 1406 can include abstractions of at least a portion of the physical compute resources 1408, the physical memory resources 1410, and/or the other physical resources 1412, or any combination thereof. In some embodiments, the abstractions can include one or more virtual machines upon which one or more applications can be executed. In some embodiments, one or more components of the IP/MPLS network 102, one or more components of the DWDM core network 104, the SDN controller 108, one or more of the routers 110, one or more of the vendor network controllers 112, one or more components of one or more of the DWDM vendor sub-networks 114, the multi-layer network planning system 120, and/or other elements disclosed herein can be implemented in the virtual environment 1406.

Figure 15:
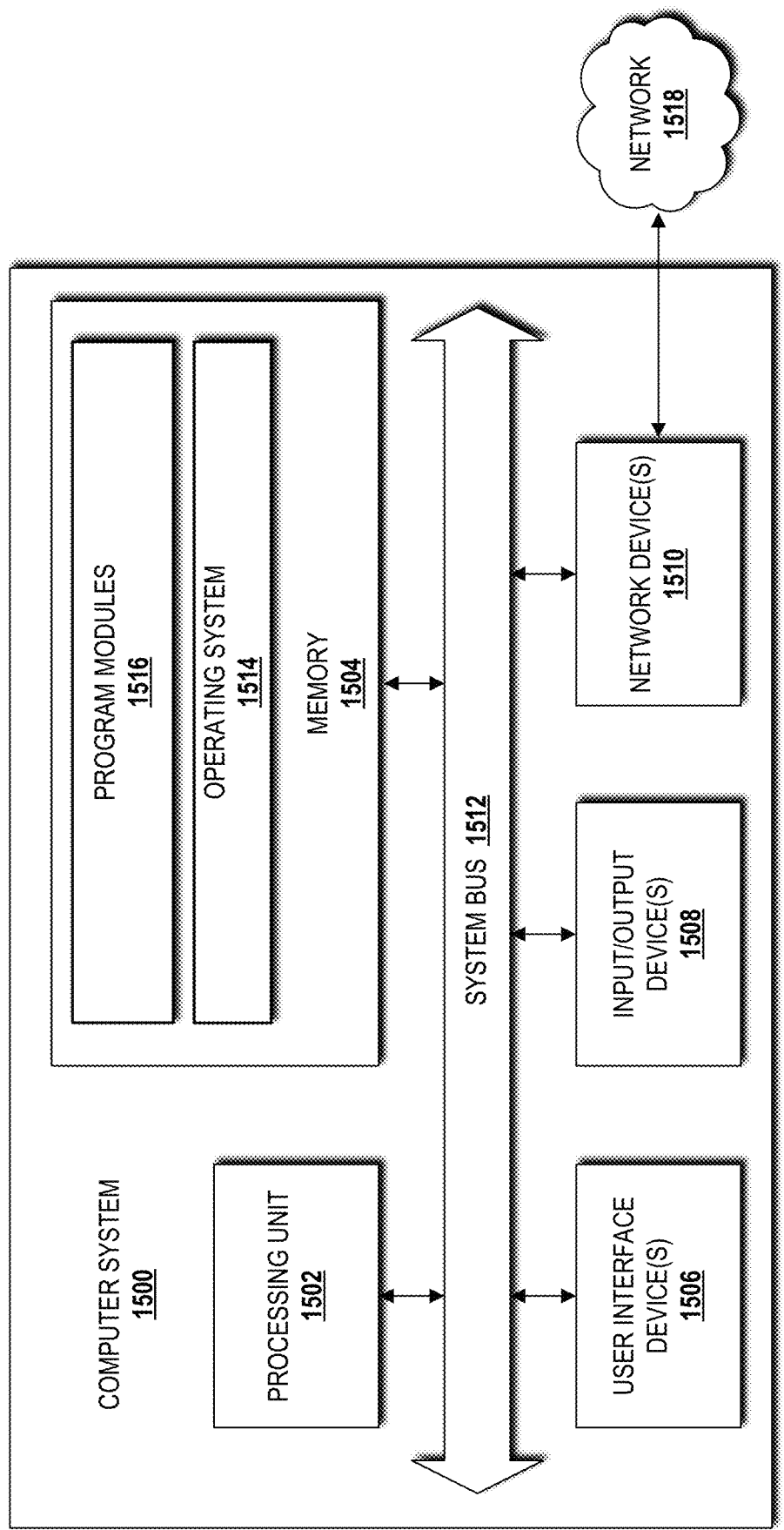
FIG. 15 is a block diagram illustrating an example computer system capable of implementing aspects of the embodiments presented herein.

FIG. 15 is a block diagram illustrating a computer system 1500 configured to provide the functionality in accordance with various embodiments of the concepts and technologies disclosed herein. In some embodiments, one or more components of the IP/MPLS network 102, one or more components of the DWDM core network 104, the SDN controller 108, one or more of the routers 110, one or more of the vendor network controllers 112, one or more components of one or more of the DWDM vendor sub-networks 114, the multi-layer network planning system 120, and/or other elements disclosed herein can be configured, at least in part, like the architecture of the computer system 1500. In some implementations, the physical environment 1402 (illustrated in FIG. 14) includes one or more computers that are configured like the architecture of the computer system 1500. The computer system 1500 may provide at least a portion of the physical compute resources 1408, the physical memory resources 1410, and/or the other physical resources 1412. It should be understood, however, that modification to the architecture may be made to facilitate certain interactions among elements described herein.

The computer system 1500 includes a processing unit 1502, a memory 1504, one or more user interface devices 1506, one or more input/output ("I/O") devices 1508, and one or more network devices 1510, each of which is operatively connected to a system bus 1512. The bus 1512 enables bi-directional communication between the processing unit 1502, the memory 1504, the user interface devices 1506, the I/O devices 1508, and the network devices 1510.

The processing unit 1502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The physical compute resources 1408 (illustrated in FIG. 14) can include one or more processing units 1502.

The memory 1504 communicates with the processing unit 1502 via the system bus 1512. In some embodiments, the memory 1504 is operatively connected to a memory controller (not shown) that enables communication with the processing unit 1502 via the system bus 1512. The physical memory resources 1410 (illustrated in FIG. 14) can include one or more instances of the memory 1504. The illustrated memory 1504 contains an operating system 1514 and one or more program modules 1516. The operating system 1514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1516 may include various software and/or program modules to perform the various operations described herein. The program modules 1516 and/or other programs can be embodied in computer-readable media containing instructions that, when executed by the processing unit 1502, perform various operations such as those described herein. According to embodiments, the program modules 1516 may be embodied in hardware, software, firmware, or any combination thereof.

By way of example, and not limitation, computer-readable media may include any available computer storage media or communication media that can be accessed by the computer system 1500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1500. In the claims, the phrase "computer storage medium" and variations thereof does not include waves or signals per se and/or communication media.

The user interface devices 1506 may include one or more devices with which a user accesses the computer system 1500. The user interface devices 1506 may include, but are not limited to, computers, servers, PDAs, cellular phones, or any suitable computing devices. The I/O devices 1508 enable a user to interface with the program modules 1516. In one embodiment, the I/O devices 1508 are operatively connected to an I/O controller (not shown) that enables communication with the processing unit 1502 via the system bus 1512. The I/O devices 1508 may include one or more input devices, such as, but not limited to, a keyboard, a mouse, or an electronic stylus. Further, the I/O devices 1508 may include one or more output devices, such as, but not limited to, a display screen or a printer. In some embodiments, the I/O devices 1508 can be used for manual controls for operations to exercise under certain emergency situations.

The network devices 1510 enable the computer system 1500 to communicate with other networks or remote systems via a network 1518. Examples of the network devices 1510 include, but are not limited to, a modem, a radio frequency ("RF") or infrared ("IR") transceiver, a telephonic interface, a bridge, a router, or a network card. The network 1518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1518 may be a wired network such as, but not limited to, a Wide Area Network ("WAN"), a wired Personal Area Network ("PAN"), or a wired Metropolitan Area Network ("MAN"). The network 1518 may be any other network described herein.

Figure 16:
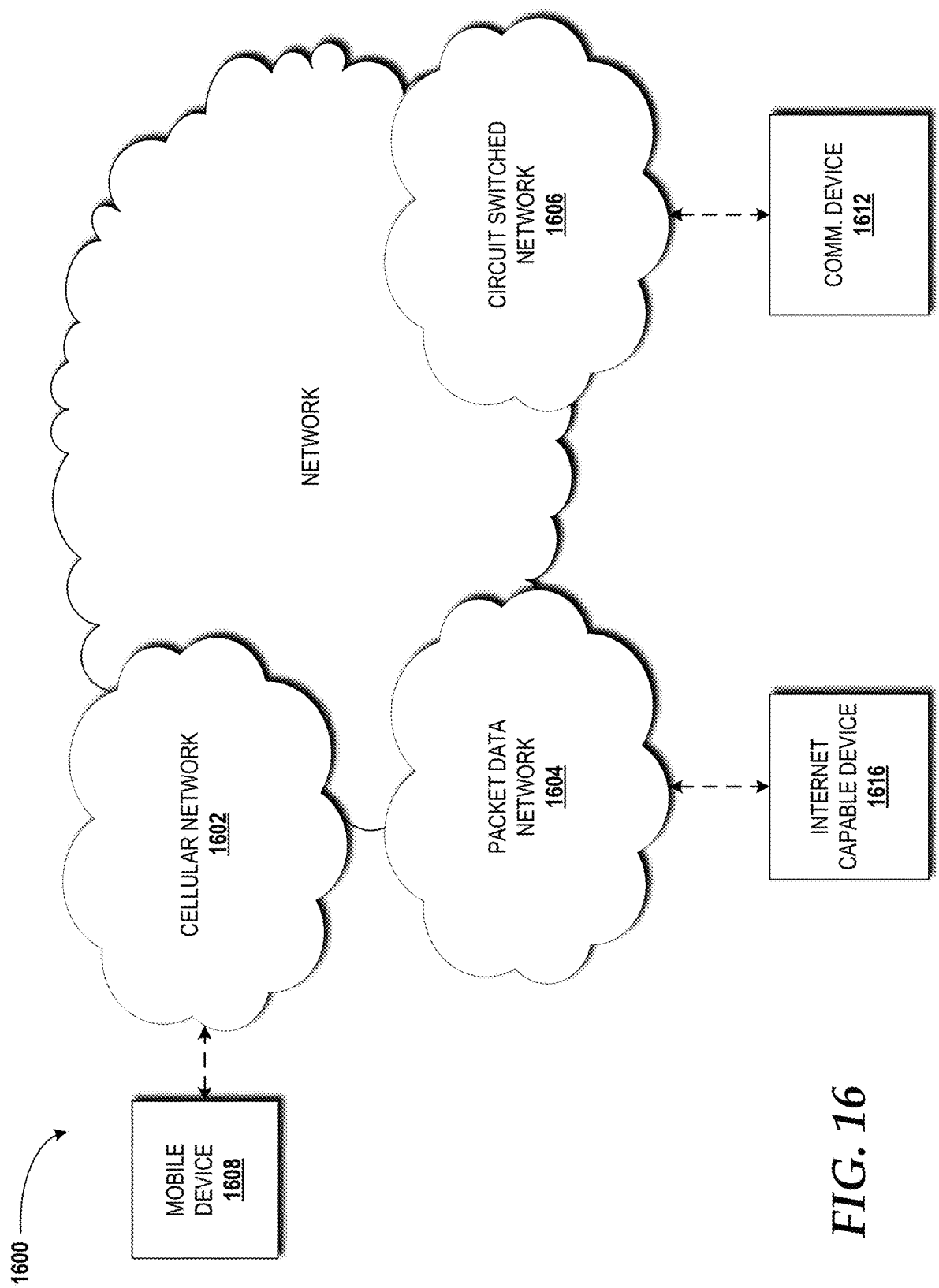
FIG. 16 is a diagram illustrating a network, according to an illustrative embodiment.

Turning now to FIG. 16, details of a network 1600 are illustrated, according to an illustrative embodiment. The network 1600 includes a cellular network 1602, a packet data network 1604, for example, the Internet, and a circuit switched network 1606, for example, a public-switched telephone network ("PSTN"). The cellular network 1602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1602 also includes radios and nodes for receiving and transmitting voice, video data, and combinations thereof to and from radio transceivers, networks, the packet data network 1604, and the circuit switched network 1606.

A mobile communications device 1608, such as, for example, a cellular telephone, a user equipment, a mobile terminal, a PDA, a laptop computer, a handheld computer, and combinations thereof, can be operatively connected to the cellular network 1602. The cellular network 1602 can be configured as a Global System for Mobile communications ("GSM") network and can provide data communications via General Packet Radio Service ("GPRS") and/or Enhanced Data rates for GSM Evolution ("EDGE"). Additionally, or alternatively, the cellular network 1602 can be configured as a 3G Universal Mobile Telecommunications Service ("UMTS") network and can provide data communications via the High-Speed Packet Access ("HSPA") protocol family, for example, High-Speed Downlink Packet Access ("HSDPA"), High-Speed Uplink Packet Access ("HSUPA") (also known as Enhanced Uplink ("EUL")), and HSPA+. The cellular network 1602 also is compatible with 4G mobile communications standards such as Long-Term Evolution ("LTE"), or the like, as well as evolved and future mobile standards.

The packet data network 1604 includes various devices, for example, servers, computers, databases, routers, packet gateways, and other devices in communication with one another, as is generally known. The packet data network 1604 can be or can include the IP/MPLS network 102. The packet data network 1604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1604 includes or is in communication with the Internet. The circuit switched network 1606 includes various hardware and software for providing circuit switched communications. The circuit switched network 1606 may include, or may be, what is often referred to as a plain old telephone system ("POTS"). The functionality of a circuit switched network 1606 or other circuit-switched network are generally known and will not be described herein in detail.

The illustrated cellular network 1602 is shown in communication with the packet data network 1604 and a circuit switched network 1606, though it should be appreciated that this is not necessarily the case. One or more Internet-capable devices 1616, for example, a PC, a laptop, a portable device, or another suitable device, can communicate with one or more cellular networks 1602, and devices connected thereto, through the packet data network 1604. It also should be appreciated that the Internet-capable device 1616 can communicate with the packet data network 1604 through the circuit switched network 1606, the cellular network 1602, and/or via other networks (not illustrated).

As illustrated, a communications device 1612, for example, a telephone, facsimile machine, modem, computer, or the like, can be in communication with the circuit switched network 1606, and therethrough the packet data network 1604 and/or the cellular network 1602. It should be appreciated that the communications device 1612 can be an Internet-capable device, and can be substantially similar to the Internet-capable device 1616. In the specification, the network is used to refer broadly to any combination of the networks 1602, 1604, 1606.

The advent of CD-ROADM technology has significant implications for network design and operation. The concepts and technologies disclosed herein consider an SDN-controlled dynamic IP-over-optical network, and optimize the regenerator site planning and regenerator pre-deployment for both layers' demands. Algorithms have been described that account for various routing schemes and demonstrate significant savings from regenerator site selection and sharing across demands and failure scenarios. Two different restoration design schemes have been described. Both designs respond to router failures with additional pre-deployed router line-cards and transponders to add capacity to the network, using additional regenerators as needed. The designs differ in the response strategy to fiber-cut failures. The first restoration design scheme uses IP and ROADM layer resources along surviving IP links; many of these resources will already be pre-deployed to deal with router failures. The second restoration design scheme only uses ROADM layer resources to re-create the failed IP links. The new connection re-uses the original router line cards and transponders, so no additional ones are required, but this requires that more regenerators be deployed. When failures are restored by adding capacity on surviving IP links along their original paths (i.e., restoration in accordance with the first restoration design scheme), the number of regenerators that must be pre-deployed for failure restoration is far less than when capacity is restored by re-creating the original IP links in the optical layer along longer paths (i.e., restoration in accordance with the second restoration design scheme). However, the first restoration design scheme requires more coordination in the IP and optical-layer planning process. The second restoration design scheme might be more appropriate for metro networks, where regeneration along restoration paths is less likely to be needed because nodes are not as widely separated.

Based on the foregoing, it should be appreciated that concepts and technologies directed to routing and regenerator planning in a carrier's core reconfiguration optical network have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    determining, by a network planning system comprising a processor, a set of regenerator sites in a multi-layer network, wherein the multi-layer network comprises an optical layer and an upper layer, wherein the upper layer utilizes the optical layer to create links between a set of nodes of the upper layer, and wherein the set of regenerator sites have previously been found to cover at least a portion of paths among a set of optical nodes of the optical layer;
    determining, by the network planning system, a set of candidate regenerator sites in the optical layer for use by the links between the set of nodes of the upper layer, wherein each regenerator site of the optical layer can be selected as a candidate regenerate site for the links;
    selecting, by the network planning system, from the set of candidate regenerator sites, a best regenerator site;
    moving, by the network planning system, the best regenerator site from the set of candidate regenerator sites into the set of regenerator sites for the links; and
    in response to a failure, restoring a path in the multi-layer network using a best set of regenerator sites comprising the best regenerator site.

2. The method of claim 1, wherein selecting, by the network planning system, from the set of candidate regenerator sites, the best regenerator site comprises selecting, by the network planning system, from the set of candidate regenerator sites, the best regenerator site based upon a rank function.

3. The method of claim 2, wherein the upper layer comprises an IP layer; and wherein selecting, by the network planning system, from the set of candidate regenerator sites, the best regenerator site based upon the rank function comprises selecting, from the set of optical nodes operating in the optical layer, a specific optical node as the best regenerator site, wherein the specific optical node belongs to a minimum cost path of a highest number of node pairs that do not have a valid path.

4. The method of claim 2, wherein the upper layer comprises an IP layer; and wherein selecting, by the network planning system, from the set of candidate regenerator sites, the best regenerator site based upon the rank function comprises counting node pairs that provide a valid path as a result of placing a regenerator at a specific optical node of the set of optical nodes operating in the optical layer, wherein the specific optical node has a highest number of node pairs.

5. The method of claim 2, wherein selecting, by the network planning system, from the set of candidate regenerator sites, the best regenerator site based upon the rank function comprises selecting, by the network planning system, from the set of candidate regenerator sites, the best regenerator site based upon a weighted combination of two rank functions.

6. The method of claim 5, wherein a first rank function of the two rank functions selects, from the set of optical nodes operating in the optical layer of the multi-layer network, a first specific optical node as the best regenerator site, wherein the first specific optical node belongs to a minimum cost path of a highest number of node pairs that do not have a valid path; and wherein a second rank function of the two rank functions counts node pairs that provide a valid path as a result of placing a regenerator at a second specific optical node of the set of optical nodes operating in the optical layer, wherein the second specific optical node has a highest number of node pairs.

7. The method of claim 5, wherein the weighted combination is biased towards the second rank function.

8. The method of claim 1, wherein the failure comprises:
    a router failure of a router operating within the upper layer of the multi-layer network; or
    an optical fiber failure of an optical fiber operating within the optical layer of the multi-layer network.

9. A network planning system comprising:
    a processor; and
    a memory comprising instructions that, when executed by the processor, cause the processor to perform operations comprising
        determining a set of regenerator sites in a multi-layer network, wherein the multi-layer network comprises an optical layer and an upper layer, wherein the upper layer utilizes the optical layer to create links between a set of nodes of the upper layer, and wherein the set of regenerator sites have previously been found to cover at least a portion of paths among a set of optical nodes of the optical layer,
        determining a set of candidate regenerator sites in the optical layer for use by the links between the set of nodes of the upper layer, wherein each regenerator site of the optical layer can be selected as a candidate regenerate site for the links,
        selecting, from the set of candidate regenerator sites, a best regenerator site,
        moving the best regenerator site from the set of candidate regenerator sites into the set of regenerator sites for the links, and
        in response to a failure, restoring a path in the multi-layer network using a best set of regenerator sites comprising the best regenerator site.

10. The network planning system of claim 9, wherein selecting, from the set of candidate regenerator sites, the best regenerator site comprises selecting, from the set of candidate regenerator sites, the best regenerator site based upon a rank function.

11. The network planning system of claim 10, wherein the upper layer comprises an IP layer; and wherein selecting, from the set of candidate regenerator sites, the best regenerator site based upon the rank function comprises selecting, from the set of optical nodes operating in the optical layer, a specific optical node as the best regenerator site, wherein the specific optical node belongs to a minimum cost path of a highest number of node pairs that do not have a valid path.

12. The network planning system of claim 10, wherein the upper layer comprises an IP layer; and wherein selecting, from the set of candidate regenerator sites, the best regenerator site based upon the rank function comprises counting node pairs that provide a valid path as a result of placing a regenerator at a specific optical node of the set of optical nodes operating in the optical layer, wherein the specific optical node has a highest number of node pairs.

13. The network planning system of claim 10, wherein selecting, from the set of candidate regenerator sites, the best regenerator site based upon the rank function comprises selecting, from the set of candidate regenerator sites, the best regenerator site based upon a weighted combination of two rank functions.

14. The network planning system of claim 13, wherein a first rank function of the two rank functions selects, from the set of optical nodes operating in the optical layer of the multi-layer network, a first specific optical node as the best regenerator site, wherein the first specific optical node belongs to a minimum cost path of a highest number of node pairs that do not have a valid path; and wherein a second rank function of the two rank functions counts node pairs that provide a valid path as a result of placing a regenerator at a second specific optical node of the set of optical nodes operating in the optical layer, wherein the second specific optical node has a highest number of node pairs.

15. The network planning system of claim 14, wherein the weighted combination is biased towards the second rank function.

16. A computer-readable storage medium comprising computer-executable instructions that, when executed by a processor of a network planning system, cause the processor to perform operations comprising:
determining a set of regenerator sites in a multi-layer network, wherein the multi-layer network comprises an optical layer and an upper layer, wherein the upper layer utilizes the optical layer to create links between a set of nodes of the upper layer, and wherein the set of regenerator sites have previously been found to cover at least a portion of paths among a set of optical nodes of the optical layer;
determining a set of candidate regenerator sites in the optical layer for use by the links between the set of nodes of the upper layer, wherein each regenerator site of the optical layer can be selected as a candidate regenerate site for the links;
selecting, from the set of candidate regenerator sites, a best regenerator site;
moving the best regenerator site from the set of candidate regenerator sites into the set of regenerator sites for the links; and
in response to a failure, restoring a path in the multi-layer network using a best set of regenerator sites comprising the best regenerator site.

17. The computer-readable storage medium of claim 16, wherein selecting, from the set of candidate regenerator sites, the best regenerator site comprises selecting, from the set of candidate regenerator sites, the best regenerator site based upon a rank function.

18. The computer-readable storage medium of claim 17, wherein the upper layer comprises an IP layer; and wherein selecting, from the set of candidate regenerator sites, the best regenerator site based upon the rank function comprises selecting, from the set of optical nodes operating in the optical layer, a specific optical node as the best regenerator site, wherein the specific optical node belongs to a minimum cost path of a highest number of node pairs that do not have a valid path.

19. The computer-readable storage medium of claim 17, wherein the upper layer comprises an IP layer; and wherein selecting, from the set of candidate regenerator sites, the best regenerator site based upon the rank function comprises counting node pairs that provide a valid path as a result of placing a regenerator at a specific optical node of the set of optical nodes operating in the optical layer, wherein the specific optical node has a highest number of node pairs.

20. The computer-readable storage medium of claim 17, wherein selecting, from the set of candidate regenerator sites, the best regenerator site based upon the rank function comprises selecting, from the set of candidate regenerator sites, the best regenerator site based upon a weighted combination of two rank functions; wherein a first rank function of the two rank functions selects, from the set of optical nodes operating in the optical layer of the multi-layer network, a first specific optical node as the best regenerator site, wherein the first specific optical node belongs to a minimum cost path of a highest number of node pairs that do not have a valid path; and wherein a second rank function of the two rank functions counts node pairs that provide a valid path as a result of placing a regenerator at a second specific optical node of the set of optical nodes operating in the optical layer, wherein the second specific optical node has a highest number of node pairs.

* * * * *